(12) United States Patent
Komatsu

(10) Patent No.: US 10,897,557 B2
(45) Date of Patent: Jan. 19, 2021

(54) IMAGE FORMING APPARATUS PERFORMING COLOR CALIBRATING BY READING A PLURALITY OF PATTERNS OF DIFFERENT COLORS

(71) Applicant: Manabu Komatsu, Tokyo (JP)

(72) Inventor: Manabu Komatsu, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/683,433

(22) Filed: Nov. 14, 2019

(65) Prior Publication Data

US 2020/0162638 A1 May 21, 2020

(30) Foreign Application Priority Data

Nov. 21, 2018 (JP) ................. 2018-218716

(51) Int. Cl.
| | | |
|---|---|---|
| G06F 15/00 | (2006.01) | |
| G06K 1/00 | (2006.01) | |
| G06K 15/00 | (2006.01) | |
| H04N 1/60 | (2006.01) | |
| H04N 1/00 | (2006.01) | |

(52) U.S. Cl.
CPC ........... H04N 1/60 (2013.01); H04N 1/00013 (2013.01); H04N 1/00037 (2013.01); H04N 1/00045 (2013.01); H04N 1/00087 (2013.01); H04N 2201/0094 (2013.01)

(58) Field of Classification Search
CPC .. H04N 1/60; H04N 1/00013; H04N 1/00037; H04N 1/00045; H04N 1/00087; H04N 2201/0094

USPC ............... 358/1.14, 1.15, 1.13, 1.1
See application file for complete search history.

(56) References Cited

U.S. PATENT DOCUMENTS

| | | |
|---|---|---|
| 5,519,515 A | 5/1996 | Komatsu |
| 5,576,845 A | 11/1996 | Komatsu |
| 5,610,732 A | 3/1997 | Komatsu |
| 5,678,135 A | 10/1997 | Fukui et al. |
| 5,831,751 A | 11/1998 | Oneda et al. |
| 6,005,970 A | 12/1999 | Oneda et al. |
| 6,016,359 A | 1/2000 | Komatsu |
| 7,003,176 B1 | 2/2006 | Suzuki et al. |

(Continued)

FOREIGN PATENT DOCUMENTS

| | | |
|---|---|---|
| JP | 2002-171417 | 6/2002 |
| JP | 2004-328473 | 11/2004 |
| JP | 2017-041765 | 2/2017 |

OTHER PUBLICATIONS

U.S. Appl. No. 08/359,146, filed Dec. 19, 1994 Manabu Komatsu.

Primary Examiner — Douglas Q Tran
(74) Attorney, Agent, or Firm — Oblon, McClelland, Maier & Neustadt, L.L.P.

(57) ABSTRACT

An image forming apparatus includes circuitry and a reading device. The circuitry is configured to generate a plurality of patterns in different colors to form the plurality of patterns on a recording medium. The reading device is configured to read the plurality of patterns and a plurality of blank areas adjacent to the plurality of patterns from the recording medium. The circuitry is configured to detect a reading error of the plurality of patterns according to read values of the plurality of patterns and the plurality of blank areas and perform color calibration on a reference color by use of the read values of the plurality of patterns.

9 Claims, 16 Drawing Sheets

(56) References Cited

U.S. PATENT DOCUMENTS

| | | |
|---|---|---|
| 2001/0019427 A1 | 9/2001 | Komatsu |
| 2004/0004644 A1 | 1/2004 | Komatsu et al. |
| 2005/0008258 A1 | 1/2005 | Suzuki et al. |
| 2005/0237544 A1 | 10/2005 | Suzuki et al. |
| 2006/0056683 A1 | 3/2006 | Komatsu |
| 2007/0013927 A1 | 1/2007 | Miyahara et al. |
| 2007/0058224 A1 | 3/2007 | Kawamoto et al. |
| 2007/0064267 A1 | 3/2007 | Murakata et al. |
| 2007/0070438 A1 | 3/2007 | Yoshida et al. |
| 2007/0086068 A1 | 4/2007 | Ohkawa et al. |
| 2007/0226692 A1 | 9/2007 | Nozawa et al. |
| 2008/0037036 A1 | 2/2008 | Togami |
| 2008/0186533 A1 | 8/2008 | Komatsu |
| 2008/0309994 A1 | 12/2008 | Komatsu |
| 2011/0310446 A1* | 12/2011 | Komatsu .............. H04N 1/6088 358/518 |
| 2015/0015923 A1* | 1/2015 | Hayashi ............. H04N 1/00063 358/474 |
| 2015/0172514 A1 | 6/2015 | Komatsu |
| 2018/0013924 A1* | 1/2018 | Komatsu .............. H04N 1/6075 |
| 2019/0199875 A1 | 6/2019 | Komatsu |

* cited by examiner

FIG. 5

|   | FOR PHOTOGRAPHIC PORTION | | | | FOR TEXT PORTION | | | | |
|---|---|---|---|---|---|---|---|---|---|
|   | 1 | 2 | 3 | 4 | 5 | 6 | 7 | 8 | |
| 1 |   |   |   |   |   |   |   |   | WHITE |
| 2 | 0 | 1 | 2 | 3 | 4 | 5 | 6 | 7 | |
| 3 | 8 | 9 | 10 | 11 | 12 | 13 | 14 | 15 | |
| 4 | 16 | 17 | 18 | 19 | 20 | 21 | 22 | 23 | |
| 5 | 24 | 25 | 26 | 27 | 28 | 29 | 30 | 31 | |
| 6 | 32 | 33 | 34 | 35 | 36 | 37 | 38 | 39 | |
| 7 | 40 | 41 | 42 | 43 | 44 | 45 | 46 | 47 | |
| 8 | 48 | 49 | 50 | 51 | 52 | 53 | 54 | 55 | |
| 9 | 56 | 57 | 58 | 59 | 60 | 61 | 62 | 63 | |
| 10 | 64 | 65 | 66 | 67 | 68 | 69 | 70 | 71 | |
| 11 | 72 | 73 | 74 | 75 | 76 | 77 | 78 | 79 | |
| 12 | 80 | 81 | 82 | 83 | 84 | 85 | 86 | 87 | |
| 13 | 88 | 89 | 90 | 91 | 92 | 93 | 94 | 95 | |
| 14 | 96 | 97 | 98 | 99 | 100 | 101 | 102 | 103 | |
| 15 | 104 | 105 | 106 | 107 | 108 | 109 | 110 | 111 | |
| 16 | 112 | 113 | 114 | 115 | 116 | 117 | 118 | 119 | |
| 17 | 120 | 121 | 122 | 123 | 124 | 125 | 126 | 127 | |
| 18 | 128 | 129 | 130 | 131 | 132 | 133 | 134 | 135 | |
| 19 |   |   |   |   |   |   |   |   | |
| 20 | 136 | 137 | 138 | 139 | 140 | 141 | 142 | 143 | |

FIG. 6

| DETECT POSITIONAL DEVIATION (UP) | PHOTOGRAPHIC MODE | | | | TEXT MODE | | | | DETECT POSITIONAL DEVIATION (DOWN) | |
|---|---|---|---|---|---|---|---|---|---|---|
| 0 | 1 | 2 | 3 | 4 | 5 | 6 | 7 | 8 | 9 | 0TH STEP |
| 10 | 11 | 12 | 13 | 14 | 15 | 16 | 17 | 18 | 19 | 1ST STEP |
| 20 | 21 | 22 | 23 | 24 | 25 | 26 | 27 | 28 | 29 | 2ND STEP |
| 30 | 31 | 32 | 33 | 34 | 35 | 36 | 37 | 38 | 39 | 3RD STEP |
| 40 | 41 | 42 | 43 | 44 | 45 | 46 | 47 | 48 | 49 | ⋮ |
| 50 | 51 | 52 | 53 | 54 | 55 | 56 | 57 | 58 | 59 | |
| 60 | 61 | 62 | 63 | 64 | 65 | 66 | 67 | 68 | 69 | |
| 70 | 71 | 72 | 73 | 74 | 75 | 76 | 77 | 78 | 79 | |
| 80 | 81 | 82 | 83 | 84 | 85 | 86 | 87 | 88 | 89 | |
| 90 | 91 | 92 | 93 | 94 | 95 | 96 | 97 | 98 | 99 | |
| 100 | 101 | 102 | 103 | 104 | 105 | 106 | 107 | 108 | 109 | |
| 110 | 111 | 112 | 113 | 114 | 115 | 116 | 117 | 118 | 119 | |
| 120 | 121 | 122 | 123 | 124 | 125 | 126 | 127 | 128 | 129 | |
| 130 | 131 | 132 | 133 | 134 | 135 | 136 | 137 | 138 | 139 | |
| 140 | 141 | 142 | 143 | 144 | 145 | 146 | 147 | 148 | 149 | |
| 150 | 151 | 152 | 153 | 154 | 155 | 156 | 157 | 158 | 159 | |
| 160 | 161 | 162 | 163 | 164 | 165 | 166 | 167 | 168 | 169 | |
| 170 | 171 | 172 | 173 | 174 | 175 | 176 | 177 | 178 | 179 | |
| 180 | 181 | 182 | 183 | 184 | 185 | 186 | 187 | 188 | 189 | |
| 190 | 191 | 192 | 193 | 194 | 195 | 196 | 197 | 198 | 199 | 19TH STEP |

| FIG. 7A |
| FIG. 7B |

IMAGE FORMING APPARATUS PERFORMING COLOR CALIBRATING BY READING A PLURALITY OF PATTERNS OF DIFFERENT COLORS

CROSS-REFERENCE TO RELATED APPLICATION

This patent application is based on and claims priority pursuant to 35 U.S.C. § 119(a) to Japanese Patent Application No. 2018-218716, filed on Nov. 21, 2018, in the Japan Patent Office, the entire disclosure of which is hereby incorporated by reference herein.

BACKGROUND

Technical Field

Embodiments of the present disclosure relate to an image forming apparatus, a color calibrating method, and a non-transitory computer-readable storage medium storing computer-readable program code that causes a computer to execute the color calibrating method.

Related Art

In an image forming system, a plurality of image forming apparatuses ideally have the same color reproducibility. Conventionally, the color reproducibility of the image forming apparatuses is standardized by reading output images of the image forming apparatuses with a scanner or an in-line sensor of the image forming apparatuses and adjusting the image output characteristics. Specifically, the primary color output gamma (γ) calibration or the multi-color calibration is adjusted. Alternatively, a multi-dimensional look up table (LUT), called a color profile, is updated. By such adjustment and update, the color reproducibility of the image forming apparatuses is standardized.

SUMMARY

In one embodiment of the present disclosure, a novel image forming apparatus includes circuitry and a reading device. The circuitry is configured to generate a plurality of patterns in different colors to form the plurality of patterns on a recording medium. The reading device is configured to read the plurality of patterns and a plurality of blank areas adjacent to the plurality of patterns from the recording medium. The circuitry is configured to detect a reading error of the plurality of patterns according to read values of the plurality of patterns and the plurality of blank areas and perform color calibration on a reference color by use of the read values of the plurality of patterns.

Also described are novel color calibrating method and non-transitory, computer-readable storage medium storing computer-readable program code that causes a computer to perform the color calibrating method.

BRIEF DESCRIPTION I/F THE DRAWINGS

A more complete appreciation of the embodiments and many of the attendant advantages and features thereof can be readily obtained and understood from the following detailed description with reference to the accompanying drawings, wherein:

FIG. 5 is a diagram illustrating an example of pattern data (or ACC pattern) read for auto color calibration (ACC);

FIG. 6 is a diagram of the ACC pattern for describing a detailed operation of reading the ACC pattern;

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
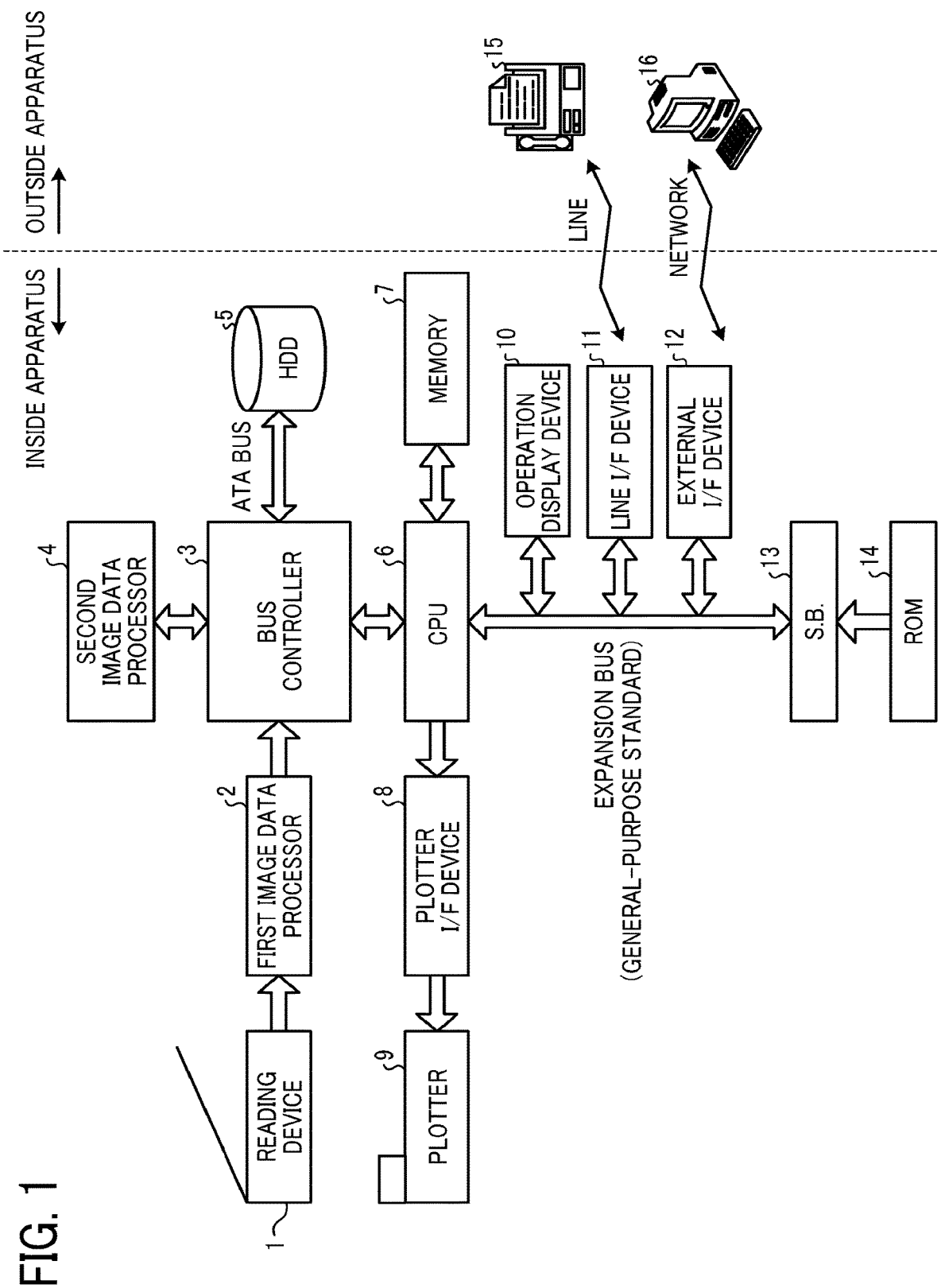
FIG. 1 is a block diagram illustrating an overall configuration of an image forming apparatus according to an embodiment of the present disclosure.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

It is to be noted that, in the following description, suffixes C, M, Y, and K denote colors of cyan, magenta, yellow, and black, respectively. To simplify the description, these suffixes are omitted unless necessary.

Referring to the drawings, wherein like reference numerals designate identical or corresponding parts throughout the several views, embodiments of the present disclosure are described below.

Initially with reference to FIG. 1, a description is given of an image forming apparatus 100 according to an embodiment of the present disclosure.

FIG. 1 is a block diagram illustrating an overall configuration of the image forming apparatus 100.

According to the present embodiment, the image forming apparatus 100 is a digital multifunction peripheral (MFP) having at least two of copying, printing, scanning, facsimile, and plotter functions. The image forming apparatus 100 includes a reading device 1, a first image data processor 2, a bus controller 3, a second image data processor 4, a hard disk drive (HDD) 5, a central processing unit (CPU) 6, and a memory 7. The image forming apparatus 100 further includes a plotter interface (I/F) device 8, a plotter 9, an operation display device 10, a line I/F device 11, an external I/F device 12, a south bridge (S.B.) 13, and a read only memory (ROM) 14. A facsimile machine 15, as an external device, is connected to the line I/F device 11. A personal computer (PC) 16, as another external device, is connected to the external I/F device 12.

The reading device 1 includes a line sensor, an analog-to-digital (A/D) converter, and drive circuits that drive the line sensor and the A/D converter. For example, the line sensor includes a photovoltaic device such as a charge coupled device (CCD) image sensor or a complementary metal oxide semiconductor (CMOS) image sensor. The reading device 1 scans a document placed and acquires density information of the document. From the density information, the reading device 1 generates and outputs 10-bit red, green, and blue (RGB) digital image data. The first image data processor 2 processes the digital image data generated by and output from the reading device 1 to unify characteristics into a predetermined characteristic and outputs the digital image data thus processed.

Figure 2:
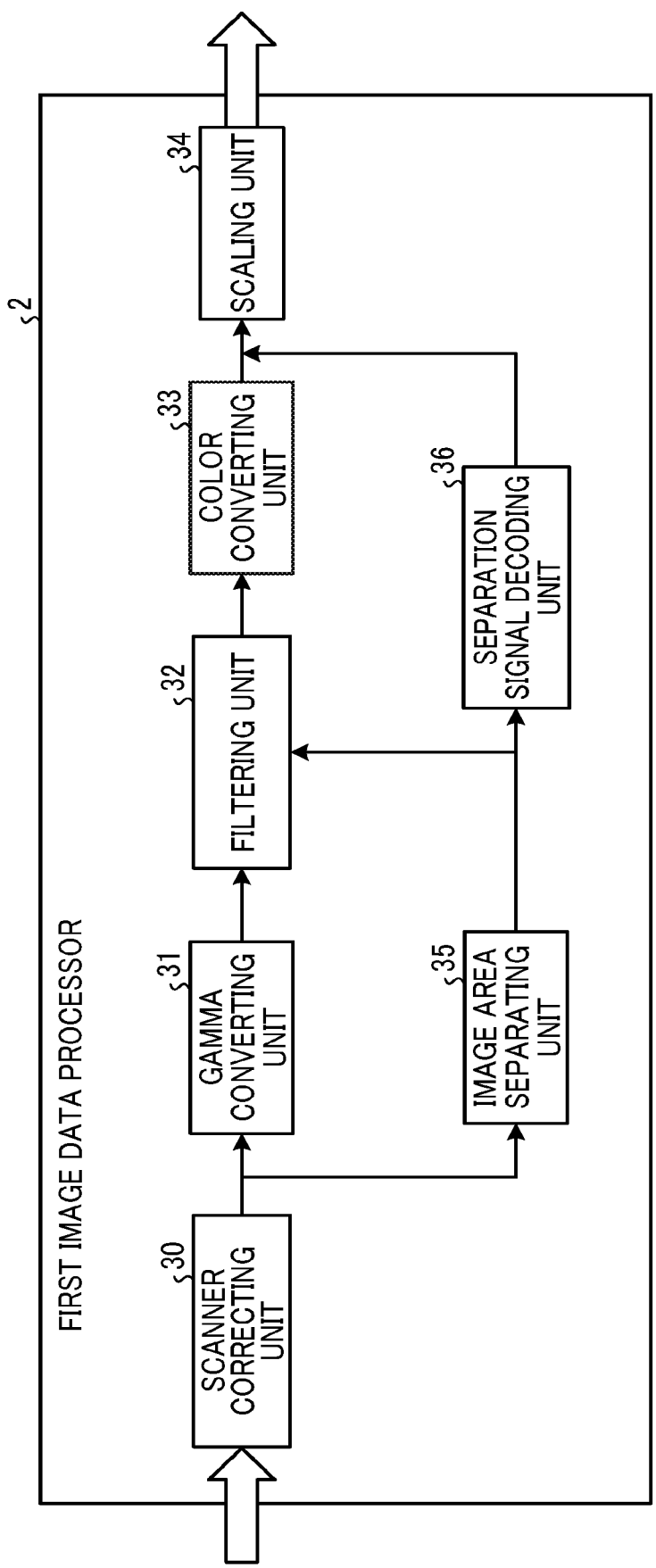
FIG. 2 is a block diagram of a first image data processor.

Referring now to FIG. 2, a description is given of the first image data processor 2 described above.

FIG. 2 is a block diagram of the first image data processor 2.

As illustrated in FIG. 2, the first image data processor 2 includes a scanner correcting unit 30, a gamma (γ) converting unit 31, a filtering unit 32, a color converting unit 33, a scaling unit 34, an image area separating unit 35, and a separation signal decoding unit 36.

The scanner correcting unit 30 performs, e.g., shading correction on the digital image data output from the reading device 1 illustrated in FIG. 1, thereby correcting, e.g., uneven reading that occurs due to the mechanism (e.g., illuminance distortion) of the reading device 1 such as a scanner.

The filtering unit 32 corrects a modulation transfer function (MTF) characteristic of the reading device 1 (e.g., scanner). In addition, the filtering unit 32 changes a frequency characteristic of a read image to prevent moire, thereby forming clear or smooth images. The gamma converting unit 31 and the color converting unit 33 correct the characteristics of the reading device 1 (hereinafter occasionally referred to as scanner characteristics) to unify color reproducibility of image data. Basically, the image data having the color reproducibility thus unified is stored inside the image forming apparatus 100. The image data thus stored is converted into image signals suitable for the characteristics of an output destination and output to be reused. A detailed description thereof is deferred.

The image area separating unit 35 extracts a characteristic area of the document. Specifically, for example, the image area separating unit 35 extracts halftone dots formed in general printing and edge portions of, e.g., characters. The image area separating unit 35 also determines whether image data is chromatic or achromatic, and whether a background image is white or not. The image area separating unit 35 outputs an image area separation signal to the separation signal decoding unit 36. The separation signal decoding unit 36 decodes the image area separation signal into an amount of information for subsequent processing performed by the second image data processor 4 illustrated in FIG. 1.

Specifically, for example, the separation signal decoding unit 36 receives, from the image area separating unit 35, a 7-bit image area separation signal as follows.

CH2: "1" for in-character or "0" for other than in-character (i.e., in-non-character)

CHR: "1" for character or "0" for non-character

HT: "1" for high line number halftone dot or "0" for non-high line number halftone dot CW: "1" for chromatic or "0" for non-chromatic (i.e., achromatic)

WS: "1" for white background or "0" for non-white background

LHT: "1" for low line number halftone dot or "0" for non-low line number halftone dot T: "1" for tracking pattern or "0" for non-tracking pattern The separation signal decoding unit 36 decodes such a 7-bit image area separation signal to express, in 3 bits, the states of black character, color character, in-character, halftone dot character, high line number halftone dot, low line number halftone dot, and photograph or tracking pattern. Alternatively, the separation signal decoding unit 36 decodes the 7-bit image area separation signal to express, in 2 bits, the states of black character, color character, and in-character or non-character.

Referring back to FIG. 1, the bus controller 3 controls a data bus that exchanges various types of data such as image data and control commands in the image forming apparatus 100. The bus controller 3 also functions as a bridge between a plurality of bus standards. For example, in the image forming apparatus 100 illustrated in FIG. 1, the bus controller 3 is connected to the first image data processor 2, the second image data processor 4, and the CPU 6 via a peripheral component interconnect (PCI)-Express bus. In addition, the bus controller 3 is connected to the HDD 5 via an advanced technology attachment (ATA) bus to form an integrated circuit called application specific integrated circuit (ASIC).

The second image data processor 4 performs image processing suitable for an output destination designated by, e.g., a user on the digital image data having the predetermined characteristic unified by the first image data processor 2 and accompanying information (e.g., image area separation signal decoded). A detailed description thereof is deferred.

In the present example, the HDD 5 is connected to the bus controller 3 via the ATA bus standardized by expanding integrated device electronics (IDE). The HDD 5 mainly stores the digital image data and the accompanying information of the digital image data. The HDD 5 also stores a color calibration program. The CPU 6, serving as a color calibration unit, executes the color calibration program to perform color calibration based on an auto color calibration (ACC) pattern as described later. The CPU 6 also serves as an error detecting unit.

The CPU 6 is a microprocessor that generally controls the image forming apparatus 100. The CPU 6 is, e.g., an integrated CPU constructed of a single CPU core with, e.g., a connecting function with a general-purpose standard I/F and a bus connecting function using a crossbar switch.

The memory 7 is, e.g., a dual inline memory module (DIMM) volatile memory. The memory 7 stores data that is temporarily exchanged to absorb a speed difference in bridging a plurality of bus standards and a processing speed difference of a connected component. In addition, the memory 7 temporarily stores programs or intermediate processing data when the CPU 6 controls the image forming apparatus 100. For high-speed processing, the CPU 6 executes a boot program stored in the ROM 14 to start up a system upon normal startup. Then, the CPU 6 executes programs loaded on the memory 7 that is accessible at high speed to perform various types of processing.

The plotter I/F device 8 performs bus bridging for outputting, to an I/F dedicated to the plotter 9, digital image data of cyan (C), magenta (M), yellow (Y), and black (K) or key plate (hereinafter referred to as CMYK digital image data) transmitted via a general-purpose standard I/F such as the PCI-Express bus as an integrated part of the CPU 6.

The plotter 9 outputs the CMYK digital image data thus received onto a recording medium in an electrophotographic process.

The S.B. 13 is a chipset used in a personal computer. The S.B. 13 is a general-purpose electronic device called "South Bridge". The S.B. 13 is a general-purpose circuit that bridges buses used upon establishment of a CPU system mainly including a PCI-Express and industry standard architecture (ISA) bridge. In the image forming apparatus 100, the S.B. 13 connects the CPU 6 and the ROM 14.

The ROM 14 stores programs (including the boot program) with which the CPU 6 controls the image forming apparatus 100. The operation display device 10 is connected to the CPU 6 via the PCI-Express bus and functions as a user interface of the image forming apparatus 100. Specifically, the operation display device 10 includes a liquid crystal display (LCD) and a key switch. The operation display device 10 displays, on the LCD, various statuses of the image forming apparatus 100, how to use the image forming apparatus 100, and the like. The operation display device 10 also detects instructions input from the user through the key switch.

The line I/F device 11 connects the PCI-Express bus and a telephone line, thereby enabling exchanges of various types of data between the image forming apparatus 100 and the facsimile machine 15, as an external device, via the telephone line.

The external I/F device 12 connects the PCI-Express bus and an external device such as the PC 16. The connection enables exchanges of various types of data between the image forming apparatus 100 and the PC 16. For example, the image forming apparatus 100 uses a network such as Ethernet (registered trademark) as a connection I/F. That is, the image forming apparatus 100 is connected to the network via the external I/F device 12.

The PC 16 has an application program or driver installed therein. The user operates the PC 16 to control the image forming apparatus 100 and exchange image data with the image forming apparatus 100.

Note that the CPU 6 encodes the image data having the unified characteristic and the accompanying information such as the image area separation signal transmitted from the first image data processor 2 or the external I/F device 12. The HDD 5 then stores the image data and the accompanying information thus encoded. The image data and the accompanying information is retrieved from the HDD 5 and decoded to be processed by the second image data processor 4 and the subsequent devices.

The image forming apparatus 100 encodes (RGB) image data having the unified characteristic by an irreversible encoding method with high compressibility such as Joint Photographic Experts Group (JPEG) encoding. By contrast, the image forming apparatus 100 encodes the accompanying information such as the image area separation signal by a reversible encoding method such as K8 encoding. Accordingly, image quality degradation is restrained.

With continued reference to FIGS. 1 and 2, a description is now given of a copying operation.

When copying a document with the image forming apparatus 100, a user, for example, places the document on the reading device 1. The user sets, e.g., a desired image quality mode and inputs an instruction to start copying, via the operation display device 10. The operation display device 10 converts information input by the user into control command data inside the device. The operation display device 10 then transmits the control command data to the CPU 6 via the PCI-Express bus.

In response to the control command data to start copying, the CPU 6 executes a program of a copying process to perform settings and operations for the copying in sequence. The reading device 1 scans the document and acquires 10-bit RGB digital image data. The reading device 1 then outputs the 10-bit RGB digital image data to the first image data processor 2. Regardless of the image quality mode set by the user, the first image data processor 2 (specifically, the scanner correcting unit 30, the gamma converting unit 31, the filtering unit 32, and the color converting unit 33 illustrated in FIG. 2) unifies the RGB digital image data to RGB signals having a predetermined characteristic. The first image data processor 2 then transmits the RGB signals to the bus controller 3. Specifically, for example, the first image data processor 2 unifies the RGB digital image data into the RGB signals such as standard RGB (sRGB) or reference output medium metric (ROMM)-RGB. The first image data processor 2 then transmits the RGB signals to the bus controller 3.

In the first image data processor 2, the separation signal decoding unit 36 decodes a 7-bit image area separation signal generated by the image area separating unit 35 into the information for the subsequent processing performed by the second image data processor 4, according to the image quality mode set by the user. For example, the separation signal decoding unit 36 receives, from the image area separating unit 35, a 7-bit image area separation signal as follows.

CH2: "1" for in-character or "0" for in-non-character

CHR: "1" for character or "0" for non-character

HT: "1" for high line number halftone dot or "0" for non-high line number halftone dot CW: "1" for chromatic or "0" for non-chromatic (i.e., achromatic)

WS: "1" for white background or "0" for non-white background

LHT: "1" for low line number halftone dot or "0" for non-low line number halftone dot T: "1" for tracking pattern or "0" for non-tracking pattern According to the image quality mode set by the user, the separation signal decoding unit 36 decodes such a 7-bit image area separation signal into 2-bit attribute information (e.g., image area separation signal) as follows.

Text document mode: black character, color character, in-character, non-character Text and photograph mixed document mode: character or non-character, chromatic or achromatic Photograph document mode: chromatic or achromatic, white background or non-white background Copy document mode: black character, color character, white background, non-character The bus controller 3 receives, from the first image data processor 2, the unified RGB image data and the attribute information (e.g., image area separation signal) having different attributes depending on the image quality mode set by the user. Then, the CPU 6 encodes and stores the unified RGB image data and the attribute information in the memory 7 or the HDD 5. The RGB image data and the attribute information for each pixel is retrieved from the memory 7 or the HDD 5 and decoded by the CPU 6. The RGB image data and the attribute information for each pixel thus decoded are then transmitted to the second image data processor 4 via the bus controller 3.

The second image data processor 4 receives and converts the RGB image data into CMYK image data for plotter output, based on the attribute information for each pixel. The second image data processor 4 then outputs the CMYK image data. The bus controller 3 receives the CMYK image data from the second image data processor 4 and stores the CMYK image data in the memory 7 via the CPU 6. The CMYK image data is retrieved from the memory 7 and transmitted to the plotter 9 via the CPU 6 and the plotter I/F device 8. The plotter 9 outputs the CMYK image data thus received onto a recording medium. Thus, a copy of the document is formed.

With continued reference to FIGS. 1 and 2, a description is now given of facsimile transmission.

For facsimile transmission, a user, for example, places a document on the reading device 1. The user sets, e.g., a desired mode and inputs an instruction to start facsimile transmission, via the operation display device 10. In response to the user instruction thus input, the operation display device 10 forms and transmits control command data to the CPU 6 via the PCI-Express bus. According to the control command data to start facsimile transmission, the CPU 6 executes a program of a facsimile transmission process to perform settings and operations for the facsimile transmission in sequence as described below.

The reading device 1 scans the document and acquires 10-bit RGB digital image data. The reading device 1 then outputs the 10-bit RGB digital image data to the first image data processor 2. The first image data processor 2 converts the RGB digital image data into RGB values (e.g., 8-bit value for each color) having a unified, predetermined characteristic. In other words, the first image data processor 2 unifies the RGB image data. The first image data processor 2 then transmits the RGB values to the bus controller 3.

The bus controller 3 receives the unified RGB image data (i.e., RGB values) from the first image data processor 2 and stores the unified RGB image data in the memory 7 via the CPU 6. The unified RGB image data is retrieved from the memory 7 and transmitted to the second image data processor 4 via the CPU 6 and the bus controller 3. The second image data processor 4 receives and converts the unified RGB image data into monochrome, binary image data for facsimile transmission. The second image data processor 4 then outputs the monochrome, binary image data.

The bus controller 3 receives the monochrome, binary image data from the second image data processor 4 and stores the monochrome, binary image data in the memory 7 via the CPU 6. The monochrome, binary image data is retrieved from the memory 7 and transmitted to the line I/F device 11 via the CPU 6. The line I/F device 11 receives and transmits the monochrome, binary image data to the facsimile machine 15, which is connected to the line I/F device 11 via the line.

With continued reference to FIGS. 1 and 2, a description is now given of scanner distribution.

When distributing a scanned image, a user, for example, places a document on the reading device 1. The user sets, e.g., a desired mode and inputs an instruction to start scanner distribution, via the operation display device 10. In response to the user instruction thus input, the operation display device 10 forms and transmits control command data to the CPU 6 via the PCI-Express bus. According to a program of a scanner distribution process, the CPU 6 performs operation specified by the control command data to start scanner distribution, thereby executing settings and operations for the scanner distribution in sequence as described below.

The reading device 1 scans the document and acquires 10-bit RGB digital image data. The reading device 1 then outputs the 10-bit RGB digital image data to the first image data processor 2. The first image data processor 2 converts the RGB digital image data into RGB values having a unified, predetermined characteristic. In other words, the first image data processor 2 unifies the RGB image data. The first image data processor 2 then transmits the RGB values to the bus controller 3. The bus controller 3 receives the unified RGB image data (i.e., RGB values) from the first image data processor 2 and stores the unified RGB image data in the memory 7 via the CPU 6. The unified RGB image data is retrieved from the memory 7 and transmitted to the second image data processor 4 via the CPU 6 and the bus controller 3. The second image data processor 4 receives and converts the unified RGB image data into image data for scanner distribution such as sRGB. The second image data processor 4 then outputs the image data (e.g., RGB multi-value, gray scale, monochrome binary).

The bus controller 3 receives the image data from the second image data processor 4 and stores the image data in the memory 7 via the CPU 6. The image data is retrieved from the memory 7 and transmitted to the external I/F device 12 via the CPU 6. The external I/F device 12 receives and transmits the image data to the PC 16, which is connected to the external I/F device 12 via the network.

With continued reference to FIGS. 1 and 2, a description is now given of the copying operation and an operation of storing data in the HDD 5.

Specifically, a description is now given of operation performed for reusing image data acquired by scanning a document and stored in the image forming apparatus 100. In this case, a user, for example, places the document on the reading device 1. The user then sets, e.g., a desired image quality mode and inputs an instruction to start copying, via the operation display device 10. In response to the user instruction thus input, the operation display device 10 forms and transmits control command data to the CPU 6 via the PCI-Express bus.

According to the program of the copying process, the CPU 6 performs operation specified by the control command data to start copying, thereby executing settings and operations for the copying in sequence as described below.

The reading device 1 scans the document and acquires 10-bit RGB digital image data. The reading device 1 then outputs the 10-bit RGB digital image data to the first image data processor 2. Regardless of the image quality mode set by the user, the first image data processor 2 (specifically, the scanner correcting unit 30, the gamma converting unit 31, the filtering unit 32, and the color converting unit 33 illustrated in FIG. 2) unifies the RGB digital image data into RGB signals having a predetermined characteristic such as sRGB or an Adobe-RGB. The first image data processor 2 then transmits the RGB signals to the bus controller 3.

The scanner correcting unit 30 performs, e.g., shading correction on the digital image data output from the reading device 1 illustrated in FIG. 1, thereby correcting, e.g., uneven reading that occurs due to the mechanism (e.g., illuminance distortion) of the reading device 1 (e.g., scanner).

The gamma converting unit 31 converts a gamma (γ) characteristic of the RGB image data received from the reading device 1 into a predetermined characteristic (e.g., 1/2.2^). The filtering unit 32 unifies the sharpness of the RGB image data into a predetermined characteristic. Specifically, for example, the filtering unit 32 converts the RGB image data acquired by scanning a reference chart such that the RGB image data has an MTF characteristic value predetermined for each image quality mode set by the user. More specifically, the filtering unit 32 performs the above-described conversion by use of a parameter based on an image area separation signal generated by the image area separating unit 35.

The color converting unit 33 converts the RGB image data thus converted into RGB image data values having a predetermined characteristic such as sRGB or Optional RGB (opRGB). The scaling unit 34 unifies the size (or resolution) of the RGB image data to a predetermined characteristic such as 600 dots per inch (dpi).

In the first image data processor 2, the separation signal decoding unit 36 decodes a 7-bit image area separation signal generated by the image area separating unit 35 into the information for the subsequent processing performed by the second image data processor 4, according to the image quality mode set by the user. That is, the image area separating unit 35 outputs a 7-bit image area separation signal as follows.

CH2: "1" for in-character or "0" for in-non-character

CHR: "1" for character or "0" for non-character

HT: "1" for high line number halftone dot or "0" for non-high line number halftone dot CW: "1" for chromatic or "0" for non-chromatic (i.e., achromatic)

WS: "1" for white background or "0" for non-white background

LHT: "1" for low line number halftone dot or "0" for non-low line number halftone dot T: "1" for tracking pattern or "0" for non-tracking pattern According to the image quality mode set by the user, the separation signal decoding unit 36 decodes such a 7-bit image area separation signal into 2-bit attribute information (e.g., image area separation signal) as follows.

Text document mode: black character, color character, in-character, non-character Text and photograph mixed document mode: character or non-character, chromatic or achromatic Photograph document mode: chromatic or achromatic, white background or non-white background Copy document mode: black character, color character, white background, non-character The bus controller 3 receives, from the first image data processor 2, the unified RGB image data and the attribute information (e.g., image area separation signal) having different attributes depending on the image quality mode set by the user. Then, the CPU 6 encodes and stores the unified RGB image data and the attribute information in the memory 7. The unified RGB image data is retrieved from the memory 7 and transmitted to the HDD 5 via the CPU 6 and the bus controller 3. The HDD 5 stores the unified RGB image data together with image input conditions (in this case, scanner input or image quality mode). Thereafter, as described above, the second image data processor 4 interprets that the unified RGB image data thus retrieved from the memory 7 is a scanner-read image, together with the image quality mode set by the user. The second image data processor 4 then converts the unified RGB image data into a suitable signal form and transmits the signal to the plotter 9. Then, the plotter 9 forms a copy of the document.

Figure 3:
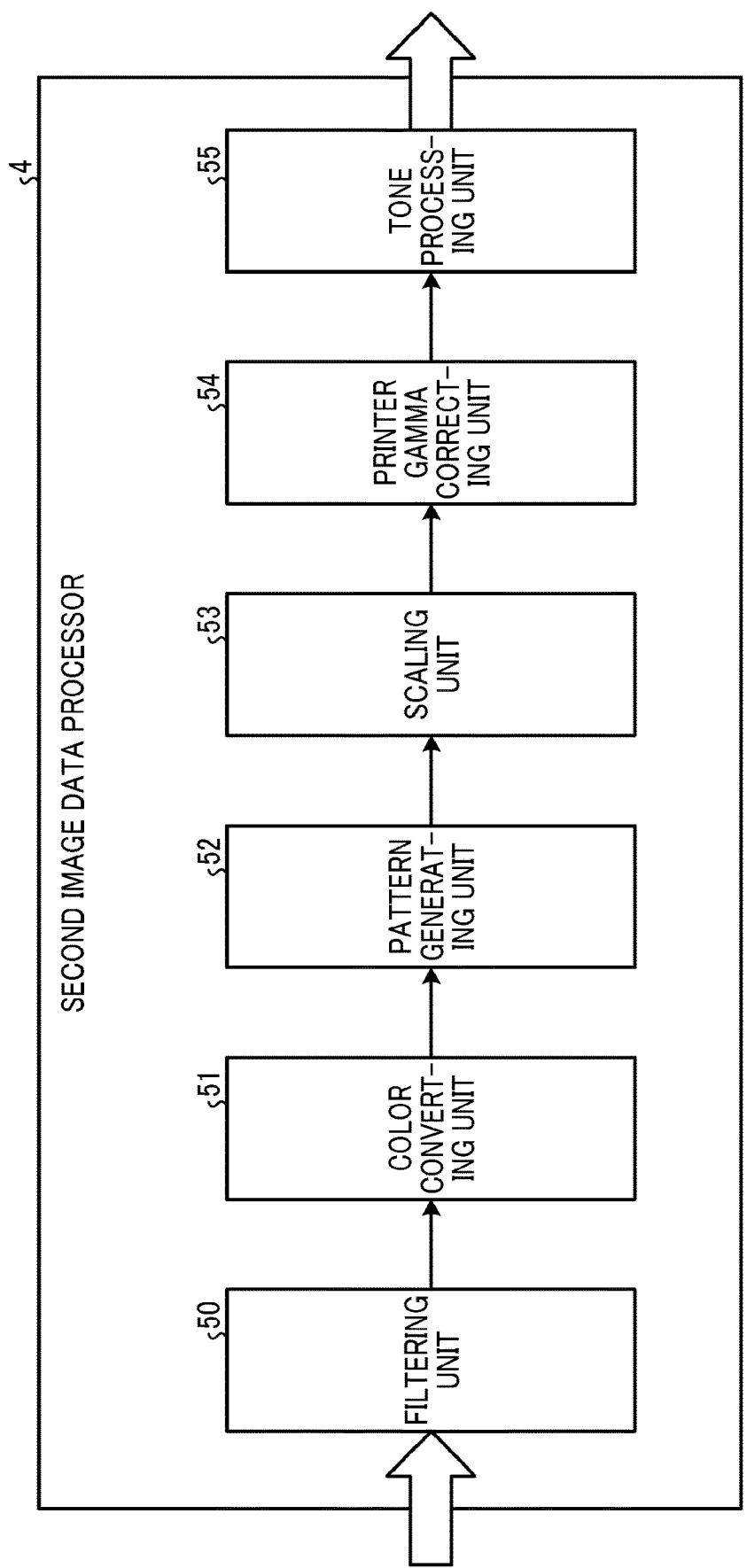
FIG. 3 is a block diagram of a second image data processor.

Referring now to FIG. 3, a description is given of the second image data processor 4 described above.

FIG. 3 is a block diagram of the second image data processor 4.

As illustrated in FIG. 3, the second image data processor 4 includes a filtering unit 50, a color converting unit 51, a pattern generating unit 52, a scaling unit 53, a printer gamma (γ) correcting unit 54, and a tone processing unit 55. The filtering unit 50 corrects the sharpness of the unified RGB image data to improve the reproducibility upon outputting the unified RGB image data to the plotter 9. Specifically, the filtering unit 50 sharpens and smooths the unified RGB image data according to the attribute information (e.g., image area separation signal) decoded according to the image quality mode set by, e.g., a user. For example, in a text document mode, the filtering unit 50 sharpens the unified RGB image data to clarify characters. In a photographic mode, the filtering unit 50 smooths the unified RGB image data to express smooth gradation.

The color converting unit 51 receives and converts the unified RGB data (i.e., 8-bit unified RGB data) into 8-bit CMYK image data corresponding to a color space for the plotter 9. Note that each of RGB of the unified RGB data is 8-bit data. At this time, the color converting unit 51 performs optimum color adjustment according to the attribute information (e.g., image area separation signal) decoded according to information of the image quality mode set by the user.

The scaling unit 53 converts the size (or resolution) of the CMYK image data according to the reproduction performance of the plotter 9. Note that, the plotter 9 of the image forming apparatus 100 has a performance of 600 dpi output. Therefore, the scaling unit 53 performs no particular conversion.

The printer gamma correcting unit 54 performs table conversion for each of CMYK by use of gamma (γ) tables for edges and non-edges for CMYK generated and set for plotter output by the CPU 6 in advance. Thus, the printer gamma correcting unit 54 performs gamma (γ) correction. The tone processing unit 55 receives the 8-bit CMYK image data and performs tone number conversion on the 8-bit CMYK image data according to the tone processing capability of the plotter 9.

As another operation upon image storing, the CPU 6 detects the usage rates of the memory 7 and the HDD 5 to change the attribute information decoded. The CPU 6 then encodes and stores the attribute information thus changed. For example, when an image is input in a state in which the usage rate of the HDD 5 exceeds a specified value, the CPU 6 discards a part of the attribute information (e.g., image area separation signal) received from the separation signal decoding unit 36. Specifically, for example, the CPU 6 sets all lower-bit pixels to 0. Then, the CPU 6 encodes and stores the attribute information. When the CPU 6 operates as described above, the attribute information (e.g., image area separation signal) is interpreted as described below according to the image quality mode set by the user, for example.

With continued reference to FIGS. 1 and 3, a description is now given of the printing operation and the operation of storing data in the HDD 5.

A user, for example, causes the PC 16 to execute a desktop publishing (DTP) application program to create and edit various documents or graphics. The user then sets a desired printer output mode and instructs the PC 16 to start printing. The PC 16 converts a document or graphic thus created or edited into information such as a command or data described in a page description language (PDL). In addition, the PC 16 translates the information described in PDL (hereinafter referred to as PDL data) and performs raster image processing (RIP) to convert the PDL data into raster image data. The PC 16 then transmits the raster image data to the CPU 6 via the external I/F device 12. In the image forming apparatus 100, the raster image data is converted to unified RGB image data having a predetermined characteristic while 4-bit attribute information is generated as below.

CHR: "1" for character or line drawing or "0" for non-character or line drawing

CW: "1" for chromatic or "0" for non-chromatic (i.e., achromatic)

WS: "1" for white background or "0" for non-white background

HS: "1" for saturated color or "0" for non-saturated color

Further, the PC 16 decodes the data or signal to 2-bit attribute information as below, according to the printer output mode set by the user. The PC 16 then transmits the 2-bit attribute information to the CPU 6 via the external I/F device 12.

General document output: achromatic color other than image, chromatic color other than image, image, white background Graphic output: achromatic color, chromatic color, white background, saturated color Photographic image output: white background or non-white background The CPU 6 receives, from the first image data processor 2, the unified RGB image data and the attribute information having different attributes depending on the image output mode set by the user. Then, the CPU 6 encodes and stores the unified RGB image data and the attribute information in the memory 7. The unified RGB image data is retrieved from the memory 7 and transmitted to the HDD 5 via the CPU 6 and the bus controller 3. The HDD 5 stores the unified RGB image data together with image input condition information such as printer output mode or image output mode.

Thereafter, as described above, the second image data processor 4 interprets that the unified RGB image data thus retrieved from the memory 7 is a printer output image, together with the image output mode set by the user. The second image data processor 4 then converts the unified RGB image data into a suitable signal form and transmits the signal to the plotter 9. Then, the plotter 9 forms a printer output image.

The color converting unit 51 receives and converts the 8-bit unified RGB data into 8-bit CMYK image data corresponding to the color space for the plotter 9. At this time, the color converting unit 51 performs optimum color adjustment according to the attribute information decoded according to information of the image quality mode set by the user.

The scaling unit 53 converts the size (or resolution) of the CMYK image data according to the reproduction performance of the plotter 9. Note that, the plotter 9 of the image forming apparatus 100 has a performance of 600 dpi output. Therefore, the scaling unit 53 performs no particular conversion.

The printer gamma correcting unit 54 performs table conversion for each of CMYK by use of $\gamma$ tables for edges and non-edges for CMYK generated and set for plotter output by the CPU 6 in advance. Thus, the printer gamma correcting unit 54 performs $\gamma$ correction. The tone processing unit 55 receives the 8-bit CMYK image data and performs tone number conversion that is optimum for the attribute information decoded according to the information of the image quality mode set by the user and the tone processing capability of the plotter 9. As another operation upon image storing, the CPU 6 detects the usage rates of the memory 7 and the HDD 5 to change the attribute information decoded. The CPU 6 then encodes and stores the attribute information thus changed.

With continued reference to FIGS. 1 and 3, a description is now given of an operation of reusing stored image data.

Specifically, a description is now given of operation performed for reusing image data stored in the HDD 5.

Initially, a description is given of a case in facsimile transmission.

A user, for example, operates the operation display device 10 to set a desired mode and input an instruction to start facsimile transmission of the image data stored in the HDD 5 upon the copying operation. The operation display device 10 converts the information input by the user into control command data inside the device. The operation display device 10 then issues the control command data. The control command data thus issued is transmitted to the CPU 6 via the PCI-Express bus.

According to the control command data to start facsimile transmission, the CPU 6 executes a program of the facsimile transmission process to perform settings and operations for the facsimile transmission in sequence. The operation process is described below in sequence.

The bus controller 3 outputs the RGB image data from the HDD 5 to the memory 7 via the CPU 6. Thereafter, as described above, the RGB image data is output from the memory 7 to the line I/F device 11 via the second image data processor 4 for facsimile transmission.

In the second image data processor 4 illustrated in FIG. 3, the filtering unit 50 corrects the sharpness of the RGB image data to improve the reproducibility upon facsimile transmission. Specifically, the filtering unit 50 sharpens and smooths the RGB image data according to information of the desired mode. For example, in the text mode (or text document mode), the filtering unit 50 sharpens the RGB image data to clarify characters. In the photographic mode, the filtering unit 50 smooths the RGB image data to express smooth gradation.

The color converting unit 51 receives and converts 8-bit RGB data into 8-bit monochrome image data of a general single color (i.e., monochrome) for the facsimile machine 15. The scaling unit 53 converts the size (or resolution) of the monochrome image data into a size (or resolution) transmittable and receivable by the facsimile machine 15, such as main scanning: 200 dpi×sub-scanning: 100 dpi. The printer gamma correcting unit 54 performs γ correction by use of a γ table for facsimile transmission set in advance by the CPU 6.

The tone processing unit 55 receives the 8-bit monochrome image data and performs tone number conversion on the 8-bit monochrome image data according to the tone processing capability transmittable and receivable by the facsimile machine 15. For example, in the image forming apparatus 100, the tone processing unit 55 performs the tone number conversion on the data to binary data by an error diffusion method, which is one of pseudo halftone processes.

With continued reference to FIGS. 1 and 3, a description is now given of a case in scanner distribution.

When distributing image data of a scanned document, a user, for example, sets a desired mode and inputs an instruction to start scanner distribution of the image data stored in the HDD 5 upon the copying operation described above, via the operation display device 10. The operation display device 10 converts the information input by the user into control command data inside the device. The operation display device 10 then issues the control command data. The control command data thus issued is transmitted to the CPU 6 via the PCI-Express bus.

According to the control command data to start scanner distribution, the CPU 6 executes a program of the scanner distribution process to perform settings and operations for the scanner distribution in sequence. The operation process is described below in sequence.

The bus controller 3 outputs the RGB image data from the HDD 5 to the memory 7 via the CPU 6. Thereafter, as described above, the RGB image data is output from the memory 7 to the line I/F device 11 via the second image data processor 4 for scanner distribution. In the second image data processor 4 illustrated in FIG. 3, the filtering unit 50 corrects the sharpness of the RGB image data to improve the reproducibility upon scanner distribution. Specifically, the filtering unit 50 sharpens and smooths the RGB image data according to information of the desired mode. For example, in the text mode, the filtering unit 50 sharpens the RGB image data to clarify characters. In the photographic mode, the filtering unit 50 smooths the RGB image data to express smooth gradation.

The color converting unit 51 receives and converts 8-bit unified RGB data into 8-bit sRGB image data corresponding to a general color space for scanner distribution. The scaling unit 53 converts the size (or resolution) of the sRGB image data into a size (or resolution) transmittable and receivable in a specified scanner distribution, such as main scanning: 200 dpi×sub-scanning: 200 dpi. The printer gamma correcting unit 54 performs γ correction by use of a γ table for scanner distribution set in advance by the CPU 6. The tone processing unit 55 receives the sRGB image data and performs tone number conversion on the sRGB image data according to the tone processing capability transmittable and receivable in the specified scanner distribution.

Note that, for example, when ascertaining that 160,000 colors of RGB each being 8-bit data are specified, the tone processing unit 55 may not perform the tone processing. In such a case, an output destination of the data stored in the image forming apparatus 100 is changeable from an output destination previously input, without changing the image quality from the image quality kept in general operation in which the output destination remains unchanged. Accordingly, the data reusability is enhanced.

Figure 4:
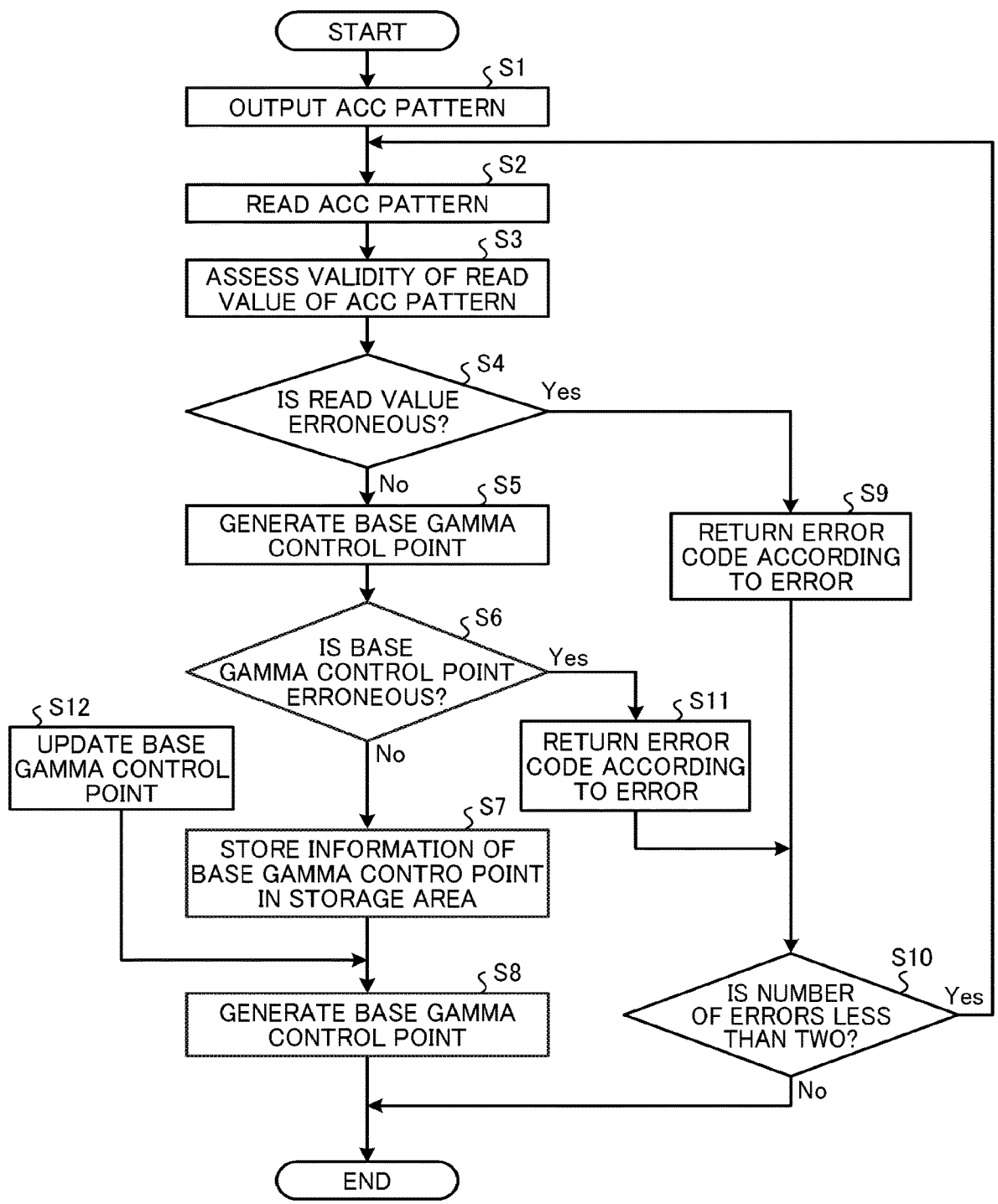
FIG. 4 is a flowchart of overall color calibration in the image forming apparatus of FIG. 1.

Referring now to FIG. 4, a description is given of color calibration in the image forming apparatus 100 described above.

FIG. 4 is a flowchart of overall color calibration in the image forming apparatus 100.

In FIG. 4, in step S1, printing of an ACC pattern or a color chart is requested for color calibration. Upon the request for printing the ACC pattern, the following operations are performed.

Firstly, a user, for example, presses an "ACC pattern print button" on the operation display device 10 to input the request for printing the ACC pattern.

Secondly, the CPU 6 executes a self-check and process control for an ACC operation.

Thirdly, the CPU 6 requests generation of an ACC pattern to generate a specified ACC pattern.

Lastly, the CPU 6 controls printing of the ACC pattern and returns a print success (i.e., OK) or a print failure (i.e., NG).

When the ACC pattern is printed successfully (i.e., OK), the user presses a read button to request the reading device 1 to start reading the ACC pattern printed on a document placed on a document tray in step S2. In response to the reading request, the reading device 1 reads the ACC pattern of the document. The data of the ACC pattern thus read (hereinafter referred to as read data of the ACC pattern) is stored in the memory 7. Specifically, the reading device 1 accesses memory data for each ACC patch, performs arithmetic averaging on 10-bit data. The reading device 1 then temporarily stores the data in the memory 7 as a read value of the specified ACC pattern. Regardless of a determination result, the read value of the ACC pattern is stored in a designated storage area such as the memory 7.

In step S3, the CPU 6 checks the read value of the ACC pattern. In other words, the CPU 6 assesses the validity of the read value of the ACC pattern. In step S4, the CPU 6 determines whether the read value of the ACC pattern is erroneous. In other words, the CPU 6 determines whether the read value of the ACC pattern is OK or NG. When the read value of the ACC pattern is NG or erroneous (YES in step S4), the CPU 6 returns an error code according to the error in step S9. That is, the CPU 6 controls devices to handle the error. Specifically, when the read value is NG at the first determination, the CPU 6 displays, on the operation display device 10, a selection screen including messages of "Read ACC pattern again?" and "Cancel reading?". When the read value is NG at the second determination (NO in step S10), the CPU 6 finishes the reading of the ACC pattern.

By contrast, when the read value of the ACC pattern is OK or not erroneous (NO in step S4), the CPU 6 generates a base gamma (γ) control point in step S5. That is, the CPU 6 calculates the base γ control point (or ACC γ original value). Note that the base γ control point is a color calibration parameter or value that is stored in the memory 7 as a representative point upon generation of a one-dimensional lookup table used for output γ correction for each of CMYK colors in the printer gamma correcting unit 54 illustrated in FIG. 3.

In step S6, the CPU 6 determines whether the base γ control point thus generated is erroneous. When the base γ control point is erroneous (YES in step S6), the CPU 6 returns an error code according to the error in step S11. That is, the CPU 6 controls devices to handle the error. Specifically, when the base γ control point is NG or erroneous at the first determination, the CPU 6 displays, on the operation display device 10, a selection screen including messages of "Generate base y control point again?" and "Cancel generation of base γ control point?". In step S10, the CPU 6 determines whether the number of errors is less than two. When the number of errors is less than two (YES in step S10), the process returns to step S2. By contrast, when the number of errors is not less than two, that is, when the base γ control point is NG or erroneous at the second determination (NO in step S10), the CPU 6 finishes the generation of the base γ control point.

When the base γ control point is OK or not erroneous (NO in step S6), the CPU 6 stores information of the base γ control point in the memory 7 (i.e., storage area) in step S7. In step S12, the CPU 6 updates the data or information of the base γ control point (or ACC γ original value) stored in the memory 7. Based on the information of the base γ control point thus updated, the CPU 6 generates a new base γ control point in step S8. Thus, the CPU 6 completes the process illustrated in FIG. 4.

The CPU 6 retrieves the updated information of the base γ control point from the memory 7 and sets the updated information of the base γ control point in the second image data processor 4. Based on the information of the base γ control point thus set, the CPU 6 adjusts gamma (γ) conversion characteristics of the printer gamma correcting unit 54 in the second image data processor 4. Accordingly, even when the image output density of the image forming apparatus 100 changes due to long-term use, the output density is corrected to an appropriate target density. Thus, the image forming apparatus 100 maintains the color reproducibility of output images.

Referring now to FIG. 5, a detailed description is given of the color calibration by use of a scanner-read value of an ACC pattern formed on a recording medium, in the image forming apparatus 100. Specifically, a description is given of a function of the image forming apparatus 100 to read, with the reading device 1, an ACC pattern formed on a recording medium and adjust output γ conversion characteristics. By adjusting the output γ conversion characteristics, the image forming apparatus 100 corrects the output density as appropriate even when the image output density changes due to long-time use of the image forming apparatus 100. Accordingly, the image forming apparatus 100 maintains the color reproducibility of output images.

In the color calibration by use of the scanner-read value of the ACC pattern in the image forming apparatus 100, the filtering unit 50 and the color converting unit 51 illustrated in FIG. 3 perform no particular conversion. The pattern generating unit 52 outputs an ACC pattern as illustrated in FIG. 5, for example. The ACC pattern is pattern data set in advance to be read for ACC. The image forming apparatus 100 sets generation of a pattern including 143 rectangular areas as described below.

FIG. 5 illustrates an example of the ACC pattern including the followings.

Columns 1 and 5: 19-step patches for K plate (Output values of K plate specified in advance are set in a RAM area.)

Columns 2 and 6: 19-step patches for C plate (Output values of C plate specified in advance are set in the RAM area.)

Columns 3 and 7: 19-step patches for M plate (Output values of M plate specified in advance are set in the RAM area.)

Columns 4 and 8: 19-step patches for Y plate (Output values of Y plate specified in advance are set in the RAM area.)

Columns 1 to 4: Photographic mode or for photograph portion (set as attribute information)

Columns 5 to 8: Text mode or for text portion (set as attribute information)

For example, the CPU 6 sets output tone values for each KCMY plate as follows.

Black: 0, 8, 16, 32, 51, 64, 80, 96, 112, 128, 144, 160, 176, 192, 208, 224, 240, 255 (, 0, 255)

Cyan: 0, 8, 16, 32, 51, 64, 80, 96, 112, 128, 144, 160, 176, 192, 208, 224, 240, 255 (, 0, 255)

Magenta: 0, 8, 16, 32, 51, 64, 80, 96, 112, 128, 144, 160, 176, 192, 208, 224, 240, 255 (, 0, 255)

Yellow: 0, 8, 16, 32, 51, 64, 80, 96, 112, 128, 144, 160, 176, 192, 208, 224, 240, 255 (, 0, 255)

Note that patches of the 1st step (i.e., background portion) are not drawn upon generation of the ACC pattern. That is, the leading element or 1st step is ignorable. The 19th step is a background pattern; whereas the 18th step and the 20th step have identical patterns.

The scaling unit 53 converts the size (or resolution) of the CMYK image data according to the reproduction performance of the plotter 9. Note that, the plotter 9 of the image forming apparatus 100 has a performance of 600 dpi output. Therefore, the scaling unit 53 performs no particular conversion.

The printer gamma correcting unit 54 performs one-dimensional table conversion for each color to obtain target output characteristics of the CMYK image data. Thus, the printer gamma correcting unit 54 performs γ correction. The tone processing unit 55 receives the 8-bit CMYK image data and the attribute information (e.g., text and photograph) and performs tone number conversion according to the tone processing capability of the plotter 9 and the 2-bit attribute information. The plotter 9 forms an image according to the image data subjected to the tone number conversion. The plotter 9 then outputs the image as an ACC pattern. The reading device 1 scans the ACC pattern on the document placed and acquires the density information of the document. From the density information, the reading device 1 outputs 10-bit RGB digital image data.

Referring now to FIG. 6, a detailed description is given of an operation of reading an ACC pattern. Upon reading the ACC pattern, the following operations are performed.

For each patch, read values of, e.g., 96-dot squares are added and divided to generate 10-bit data. The 10-bit data for each patch is transmitted as a read value of the specified ACC pattern. A description of the read value of each ACC output patch upon generation of the base γ control point is deferred. Note that a patch for detecting positional deviation and an adjacent patch are read with the same settings.

In FIG. 6, a read color component and a read image quality mode are green and "photograph", respectively, for patches 10n. Note that "n" is an integer from 0 to 19. For patches 10n+9, a read color component and a read image quality mode are blue and "text", respectively. As described above, "n" is an integer from 0 to 19.

An ACC read color component is green for a black patch. The ACC read color component is red for a cyan patch. The ACC read color component is green for a magenta patch. The ACC read color component is blue for a yellow patch. When a patch output mode is "photograph", an ACC read image quality mode is "photograph". When the patch output mode is "text", the ACC read image quality mode is "text".

Figures 7, 7A:
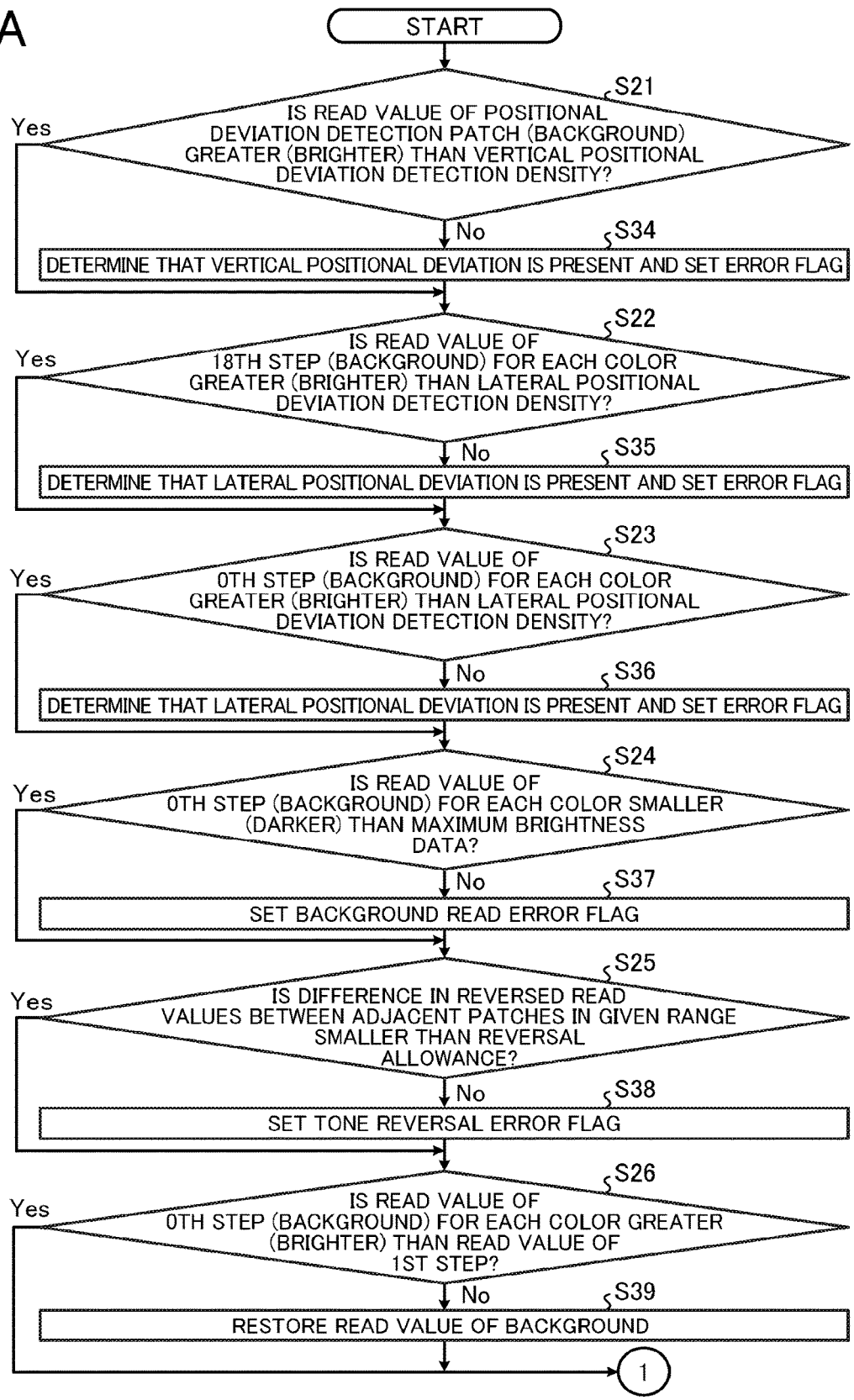
FIG. 7A is a flowchart of a process of assessing the validity of a read value of the ACC pattern.

Referring now to FIG. 7 (FIGS. 7A and 7B), a description is given of validity assessment of a read value of an ACC pattern.

Figure 7B:
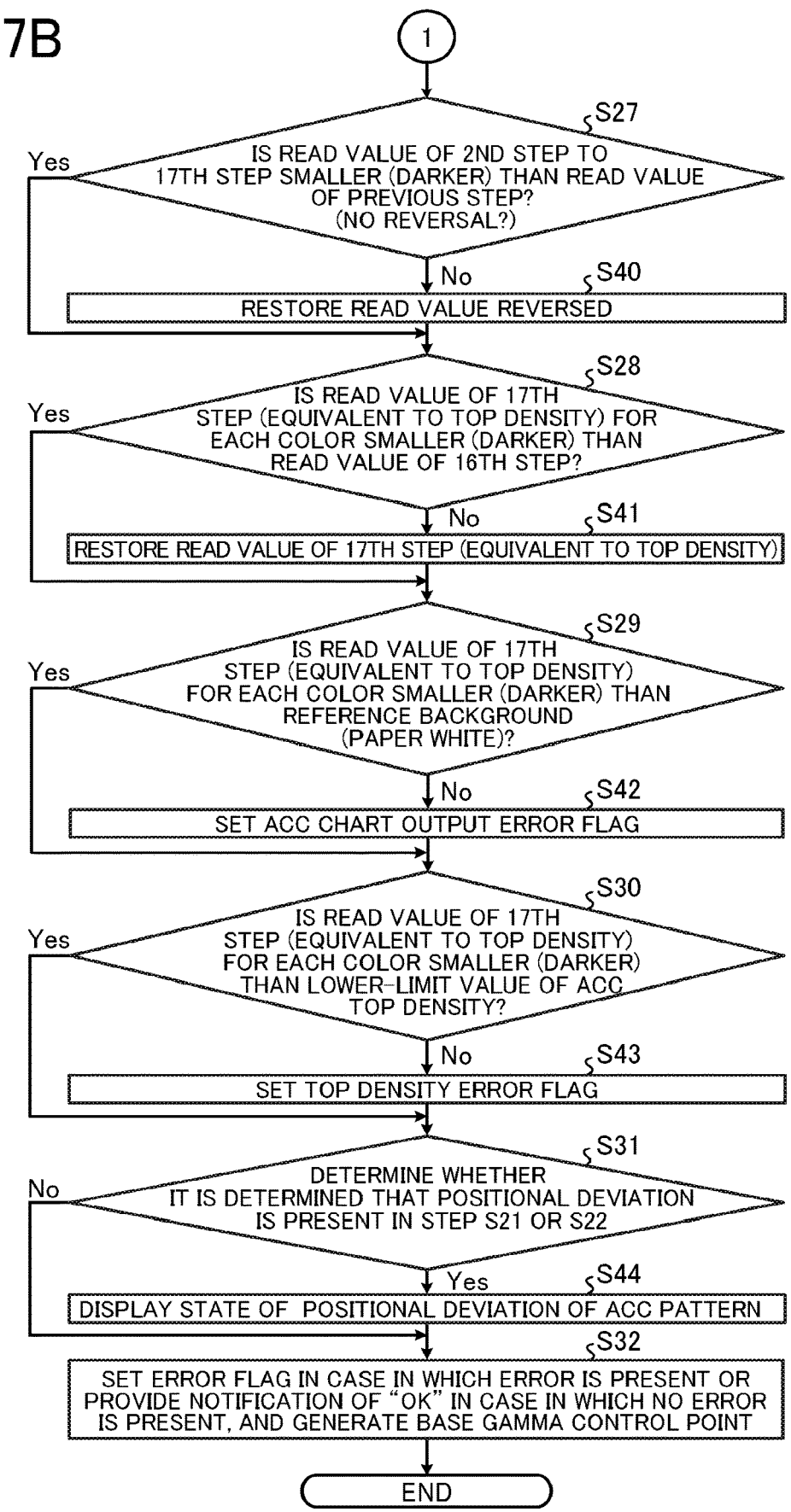
FIG. 7B is a continuation of the flowchart of the process of assessing the validity of the read value of the ACC pattern in FIG. 7A.

FIG. 7A is a flowchart of the process of assessing the validity of the read value of the ACC pattern. FIG. 7B is a continuation of the flowchart of the process of assessing the validity of the read value of the ACC pattern in FIG. 7A.

In FIG. 7 (FIGS. 7A and 7B), except for an error check in step S21, the CPU 6 performs eight error checks for each error-check step, including error checks for black, cyan, magenta, and yellow for each of the text portion and the photograph portion. When finding at least one error, the CPU 6 determines that an error exists. In such a case, the CPU 6 controls to display an error code corresponding the error.

The CPU 6 assesses the validity of the read value of the ACC pattern with respect to the following 7 items:

1) first check (i.e., error check) for read data range (i.e., background level error);
2) second check (i.e., error check) for read data range (i.e., background level error);
3) reversal check (i.e., error check) for read value of ACC pattern in guaranteed density range;
4) reversal check and restoration of read value of background (i.e., correction of read value);
5) restoration of reversed patch data (i.e., read value) (i.e., correction of read value);
6) restoration of reversed read value of patch having density equivalent to top density (i.e., correction of read value); and
7) density range check (i.e., error check) for patch having density equivalent to top density.

The following describes examples of parameters for the validity assessment of the read value of the ACC pattern. The setting values are parameterized as below and can be determined according to a desired ACC accuracy.

Lower-limit value of ACC top density: AccTop
<Black>: 192
<Cyan>: 240
<Magenta>: 256
<Yellow>: 384
Reference background data: AccWhite
<Black>: 716
<Cyan>: 716
<Magenta>: 716
<Yellow>: 716
Lateral positional deviation detection density: AccPositionLR
<Black>: 192
<Cyan>: 240
<Magenta>: 256
<Yellow>: 384
Vertical positional deviation detection step: AccStep
<UP>: 19
<DOWN>: 16
Vertical positional deviation detection density: AccPositionUD
<UP>: 192
<DOWN>: 450
Maximum brightness data (brightest value): AccBrightest
<Val>: 1020
Minimum brightness data (darkest value): AccDarkest
<Val>: 0
Data reversal allowance: AccDiffer
<Val>: 12

A description is now given of the first check for read data range (i.e., background level error).

The CPU 6 checks whether a read value of a background portion is within a given data range, thereby determining the positional deviation in a chart in a main scanning direction. Note that the background portion is an example of a margin area such as an X-th step outside the ACC pattern). The CPU 6 determines that the positional deviation is present when at least one of the following relations is satisfied.

Comparison of the read value with the vertical positional deviation detection density results in that the read value is smaller (i.e., darker) than the vertical positional deviation detection density.

Read value of "UP step" (AccStep) outside ACC pattern<Vertical positional deviation detection density UP (AccPositionUD)

Comparison of the read value with the vertical positional deviation detection density results in that the read value is smaller (i.e., darker) than the vertical positional deviation detection density.

Read value of "DOWN step" (AccStep) outside ACC pattern<Vertical positional deviation detection density DOWN (AccPositionUD)

A description is now given of the second check for read data range (i.e., background level error).

The CPU 6 checks whether a read value of a background portion (e.g., 0th and 18th steps of the ACC pattern) is within a given data range, thereby determining the positional deviation in the chart in a sub-scanning direction. The CPU 6 determines that the positional deviation is present when at least one of the following relations is satisfied.

Comparison of the read value with the lateral positional deviation detection density results in that the read value is smaller (i.e., darker) than the positional deviation detection density for each color.

Read value of the 18th step (i.e., background portion for photograph and text) of ACC pattern<Lateral positional deviation detection density (AccPositionLR)

The CPU 6 transmits an error code when at least one of the following relations is satisfied.

Comparison of the read value with the lateral positional deviation detection density results in that the read value is smaller (i.e., darker) than the positional deviation detection density for each color.

Read value of the 0th step (i.e., background portion for photograph and text) of ACC pattern<Lateral positional deviation detection density (AccPositionLR)

Comparison of the read value with the maximum brightness data (i.e., brightest value) results in that the read value is greater (i.e., brighter) than the maximum brightness data.

Read value of the 0th step (i.e., background portion for photograph and text) of ACC pattern>Maximum brightness data (AccBrightest)

A description is now given of the reversal check for the read value of the ACC pattern in a guaranteed density range.

When the read value of the ACC pattern for each patch is in a range from the reference background data (AccWhite) to the lower-limit value of ACC top density (AccTop) and when the brightness is reversed between the read values of adjacent patches, the CPU 6 checks whether a difference in reversed brightness or read values is greater than the data reversal allowance (AccDiffer) (hereinafter simply referred to as reversal allowance). Values corresponding to the patch colors are used for the reference background data (or simply referred to as reference background) and the lower limit of the top density (i.e., lower-limit value of ACC top density). When all the following conditions or relations are satisfied, the CPU 6 transmits an error code indicating that the tone values of the ACC pattern are reversed.

Read value of (N−1)th step of ACC pattern+Reversal allowance≤Read value of Nth step of ACC pattern Read value of (N−1)th step of ACC pattern<Reference background data (AccWhite)

Read value of (N−1)th step of ACC pattern>Lower-limit value of ACC top density (AccTop)

A description is now given of the reversal check and restoration of the read value of the background.

The CPU 6 checks whether a read value of the 0th step (i.e., patch corresponding to the background) of the ACC pattern is greater (i.e., brighter) than a value of the 1st step of the ACC pattern for each color. When the read value of the 0th step is smaller (i.e., darker) than the value of the 1st step, the following correction is performed.

That is, when the read value of the 0th step (i.e., patch corresponding to the background) of the ACC pattern is smaller (i.e., darker) than the value of the 1st step, the CPU 6 performs correction depending on the conditions below.

<Condition 1>: Read value of 1st step of ACC pattern<Maximum brightness data (AccBrightest)

Read value of 0th step=Read value of 1st step+1

<Condition 2>: Other than Condition 1

Read value of 0th step=Read value of 1st step=AccBrightest (Maximum brightness data)

A description is now given of the restoration of the reversed patch data (i.e., read value).

The CPU 6 compares the read value with a value of an adjacent, previous patch. When the brightness is reversed between the values, that is, when the read value is greater (i.e., brighter) than the value of the adjacent, previous patch, the CPU 6 replaces the read value (i.e., reversed read value) with previous data, (starting from the 2nd step of the ACC pattern).

A description is now given of the restoration of the reversed top density data (i.e., read value).

The CPU 6 compares a read value of the 17th step (i.e., patch having density equivalent to the top density or simply referred to as a top density patch) of the ACC pattern with a read value of the previous patch (i.e., 16th step). The CPU 6 performs correction when the following condition or relation is satisfied.

That is, when the read value of the 17th step (i.e., top density patch) of the ACC pattern is equal to the read value of the previous patch (i.e., 16th step), or semantically equal to or greater than the read value of the previous patch (i.e., 16th step) after the restoration of the reversed patch data, the CPU 6 performs correction depending on the condition below.

<Condition>: Read value of previous patch (i.e., 16th step)>Minimum brightness data (AccDarkest)

Read value of 17th step=Read value of 16th step−1

A description is now given of the density range check for the patch having density equivalent to the top density (i.e., top density patch).

The CPU 6 assesses the 17th step (i.e., top density patch) of the ACC pattern as described below. Note that values corresponding to the patch colors are used for the reference background data and the lower limit of the top density.

The CPU 6 compares a read value of the 17th step (i.e., top density patch) of the ACC pattern with the reference background data (AccWhite). When the read value is greater (i.e., brighter) than the reference background data, the CPU 6 transmits an error code indicating that the ACC pattern includes a blank.

By contrast, when the read value of the 17th step (i.e., top density patch) of the ACC pattern is smaller (i.e., darker) than the reference background data (AccWhite), the CPU 6 further compares the read value with the lower-limit value of ACC top density (AccTop). When the read value is greater (i.e., brighter) than the lower-limit value of ACC top density (AccTop), the CPU 6 returns an error code indicating that a solid portion of the ACC pattern has a low density.

With continued reference to FIG. 7 (FIGS. 7A and 7B), a description is given of a flow of the process of assessing the validity of the read value of the ACC pattern described above.

In the flowchart of FIG. 7 (FIGS. 7A and 7B), first, the CPU 6 determines whether the read value of the positional deviation detection patch (i.e., background) is greater (i.e., brighter) than the vertical positional deviation detection density in step S21. When the read value of the positional deviation detection patch (i.e., background) is greater (i.e., brighter) than the vertical positional deviation detection density (YES in step S21), the process proceeds to step S22. By contrast, when the read value of the positional deviation detection patch (i.e., background) is smaller (i.e., darker) than the vertical positional deviation detection density (NO in step S21), the CPU 6 determines that the vertical positional deviation is present and sets an error flag in step S34.

Subsequently in step S22, the CPU 6 determines whether the read value of the 18th step (i.e., background) for each color is greater (i.e., brighter) than the lateral positional deviation detection density. When the read value of the 18th step (i.e., background) for each color is greater (i.e., brighter) than the lateral positional deviation detection density (YES in step S22), the process proceeds to step S23. By contrast, when the read value of the 18th step (i.e., background) for each color is smaller (i.e., darker) than the lateral positional deviation detection density (NO in step S22), the CPU 6 determines that the lateral positional deviation is present and sets an error flag in step S35.

Subsequently in step S23, the CPU 6 determines whether the read value of the 0th step (i.e., background) for each color is greater (i.e., brighter) than the lateral positional deviation detection density. When the read value of the 0th step (i.e., background) for each color is greater (i.e., brighter) than the lateral positional deviation detection density (YES in step S23), the process proceeds to step S24. By contrast, when the read value of the 0th step (i.e., background) for each color is smaller (i.e., darker) than the lateral positional deviation detection density (NO in step S23), the CPU 6 determines that the lateral positional deviation is present and sets an error flag in step S36.

Subsequently in step S24, the CPU 6 determines whether the read value of the 0th step (i.e., background) for each color is smaller (i.e., darker) than the maximum brightness data. When the read value of the 0th step (i.e., background) for each color is smaller (i.e., darker) than the maximum brightness data (YES in step S24), the process proceeds to step S25. By contrast, when the read value of the 0th step (i.e., background) for each color is greater (i.e., brighter) than the maximum brightness data (NO in step S24), the CPU 6 sets a background read error flag in step S37.

Subsequently in step S25, when the brightness is reversed between the read values of adjacent patches in a given range, the CPU 6 determines whether a difference in reversed brightness is smaller than a reversal allowance value. In other words, the CPU 6 determines whether a difference in reversed read values between adjacent patches in a given range is smaller than the reversal allowance. When the brightness is reversed between the read values of adjacent patches in the given range and when the difference is smaller than the reversal allowance (YES in step S25), the process proceeds to step S26. By contrast, when the brightness is reversed between the read values of adjacent patches in the given range and when the difference is greater than the reversal allowance (NO in step S25), the CPU 6 sets a tone reversal error flag in step S38.

Subsequently in step S26, the CPU 6 determines whether the read value of the 0th step (i.e., background) for each color is greater (i.e., brighter) than the read value of the 1st step. When the read value of the 0th step (i.e., background) for each color is greater (i.e., brighter) than the read value of the 1st step (YES in step S26), the process proceeds to step S27. By contrast, when the read value of the 0th step (i.e., background) for each color is smaller (i.e., darker) than the read value of the 1st step (NO in step S26), the CPU 6 restores the read value of the background in step S39.

Subsequently in step S27, the CPU 6 determines whether each read value of the 2nd step to 17th step is smaller (i.e., darker) than the read value of the previous step. That is, the CPU 6 determines whether the read values of adjacent steps are not reversed. When each read value of the 2nd step to 17th step is smaller (i.e., darker) than the read value of the previous step (YES in step S27), the process proceeds to step S28. By contrast, when any read value of the 2nd step to 17th step is greater (i.e., brighter) than the read value of the previous step (NO in step S27), the CPU 6 restores, in step S40, the read value reversed.

Subsequently in step S28, the CPU 6 determines whether the read value of the 17th step (equivalent to the top density) for each color is smaller (i.e., darker) than the read value of the 16th step. When the read value of the 17th step (equivalent to the top density) for each color is smaller (i.e., darker) than the read value of the 16th step (YES in step S28), the process proceeds to step S29. By contrast, when the read value of the 17th step for each color is greater (i.e., brighter) than the read value of the 16th step (NO in step S28), the CPU 6 restores the read value of the 17th step (equivalent to the top density) in step S41.

Subsequently in step S29, the CPU 6 determines whether the read value of the 17th step (equivalent to the top density) for each color is smaller (i.e., darker) than the reference background (paper white). When the read value of the 17th step (equivalent to the top density) for each color is smaller (i.e., darker) than the reference background (paper white) (YES in step S29), the process proceeds to step S30. By contrast, when the read value of the 17th step for each color is greater (i.e., brighter) than the read value of the reference background (paper white) (NO in step S29), the CPU 6 sets an ACC chart output error flag in step S42.

Subsequently in step S30, the CPU 6 determines whether the read value of the 17th step (equivalent to the top density) for each color is smaller (i.e., darker) than the lower-limit value of ACC top density. When the read value of the 17th step (equivalent to the top density) for each color is smaller (i.e., darker) than the lower-limit value of ACC top density (AccTop) (YES in step S30), the process proceeds to step S31. By contrast, when the read value of the 17th step (equivalent to the top density) for each color is greater (i.e., brighter) than the lower-limit value of ACC top density (AccTop) (NO in step S30), the CPU 6 sets a top density error flag in step S43.

Subsequently in step S31, the CPU 6 determines whether the CPU 6 has determined that the positional deviation is present in step S21 or S22. When the CPU 6 has determined that the positional deviation is present in step S21 or S22 (YES in step S31), the CPU 6 displays a state of the positional deviation of the ACC pattern in step S44. Then, the process proceeds to step S32. By contrast, when the CPU 6 has not determined that the positional deviation is present in step S21 or S22 (NO in step S31), the process proceeds to step S32.

In step S32, the CPU 6 sets at least one error flag in a case in which at least one error is present. Alternatively, the CPU 6 provides a notification of "OK" indicating that no error is present, in a case in which no error is present. The CPU 6 then generates the base γ control point, described above as step S8 with reference to the flowchart illustrated in FIG. 4.

With the generation of the base γ control point, the CPU 6 completes the process of the flowchart illustrated in FIG. 7 (FIGS. 7A and 7B).

Figure 8:
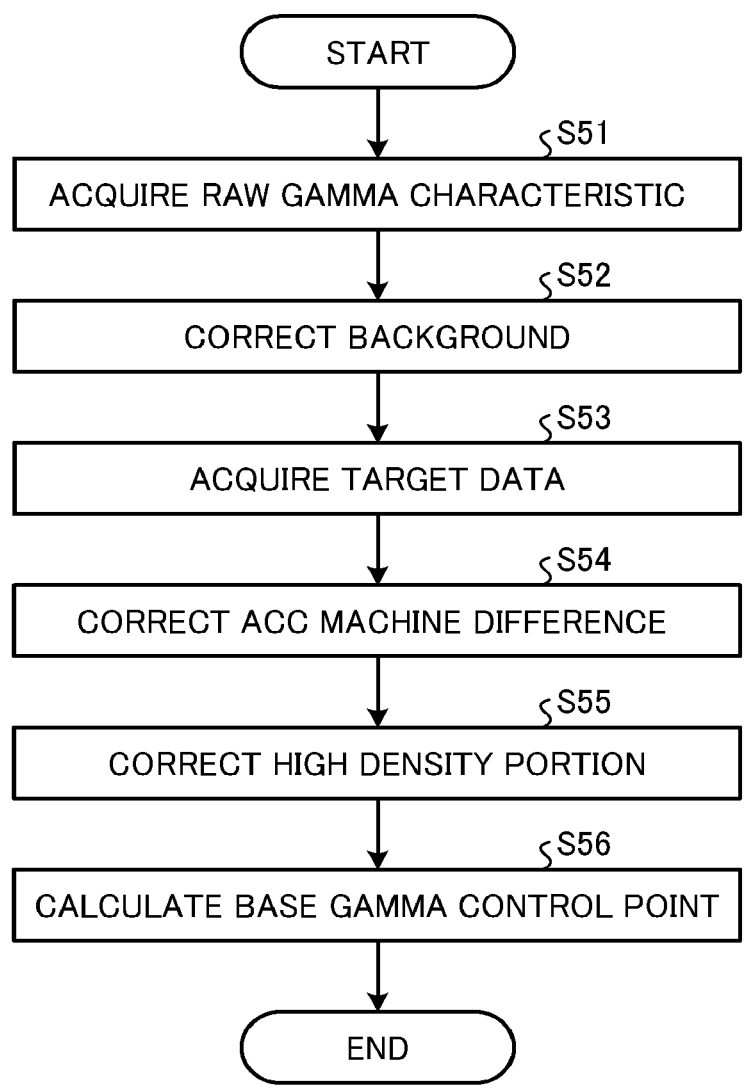
FIG. 8 is a flowchart of a process of generating a base gamma (γ) control point in the color calibration.

Referring now to FIG. 8, a description is given of the generation of the base γ control point.

FIG. 8 is a flowchart of a process of generating a base γ control point in the color calibration.

As described above, the base γ control point is a color calibration parameter or value that is stored in the memory 7 as a representative point upon generation of a one-dimensional lookup table used for output γ correction for each of CMYK colors in the printer gamma correcting unit 54 illustrated in FIG. 3. Note that, in the flowchart of FIG. 8, each step proceeds to the next step upon completion of eight operations in total for black, cyan, magenta, and yellow for each attribute of the text portion and the photograph portion.

As illustrated in FIG. 8, the CPU 6 acquires a raw gamma (γ) characteristic in step S51.

In step S52, the CPU 6 corrects a background.

In step S53, the CPU 6 acquires target data.

In step S54, the CPU 6 corrects an ACC machine difference.

In step S55, the CPU 6 corrects a high density portion.

In step S56, the CPU 6 calculates a base γ control point.

Thus, the CPU 6 performs the process described above in sequence to generate the base γ control point.

Figure 9:
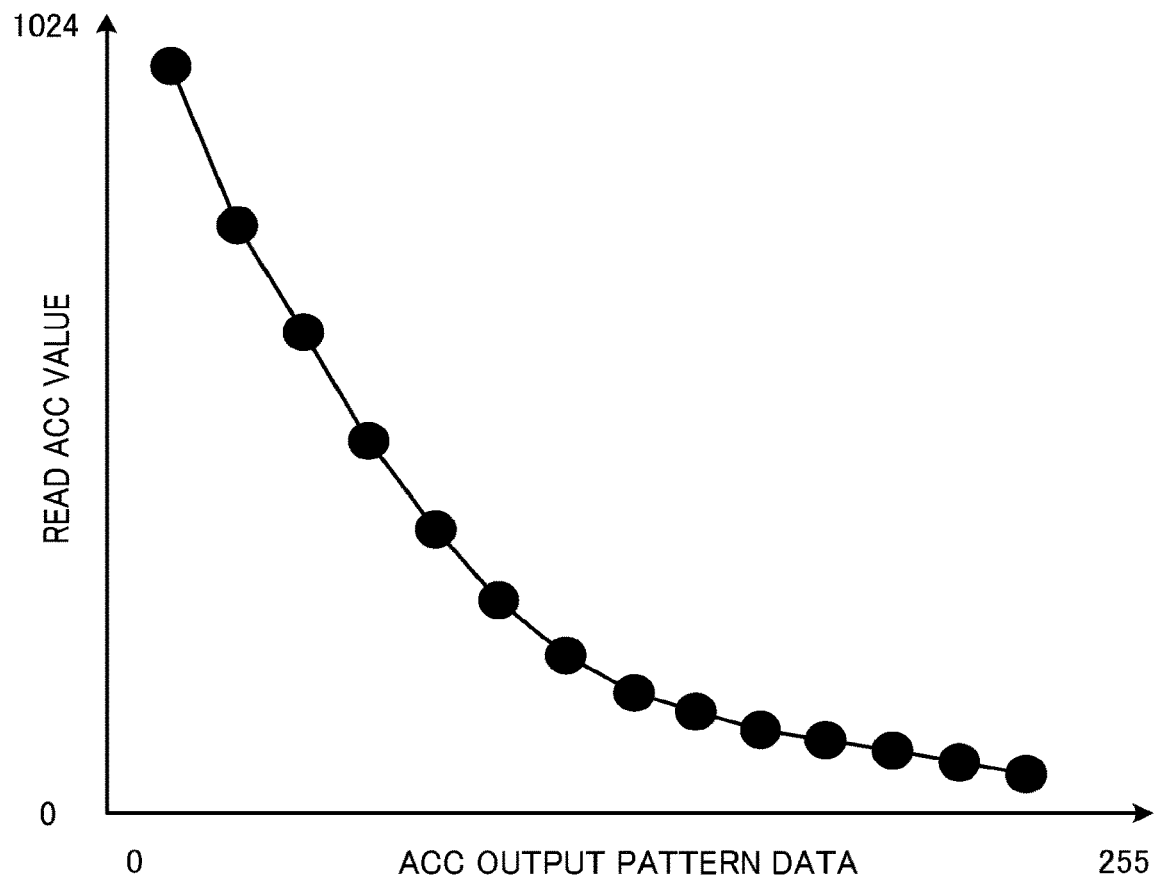
FIG. 9 is a graph illustrating a relationship between read ACC data and ACC output pattern data.

Referring now to FIG. 9, a description is given of the acquisition of the raw γ characteristic.

FIG. 9 is a graph for describing the acquisition of the raw γ characteristic for generation of the base γ control point. Specifically, FIG. 9 is a graph illustrating a relationship between ACC output pattern data and read ACC data (or read ACC value) obtained by the validity assessment of the read value of the ACC pattern described above.

The CPU 6 acquires the read ACC value and retains, as a raw γ characteristic, a correspondence of the read ACC value with the ACC output pattern. The ACC output pattern (or ACC output pattern value) corresponds to the rectangular area described above in the generation of base γ control ACC pattern.

Examples of parameters are as follows.

<Black>: 0, 8, 16, 32, 51, 64, 80, 96, 112, 128, 144, 160, 176, 192, 208, 224, 240, 255

<Cyan>: 0, 8, 16, 32, 51, 64, 80, 96, 112, 128, 144, 160, 176, 192, 208, 224, 240, 255

<Magenta>: 0, 8, 16, 32, 51, 64, 80, 96, 112, 128, 144, 160, 176, 192, 208, 224, 240, 255

<Yellow>: 0, 8, 16, 32, 51, 64, 80, 96, 112, 128, 144, 160, 176, 192, 208, 224, 240, 255

The CPU 6 sets such parameters for each of the CMYK data of the photograph area (or photograph portion) and the text area (or text portion) and retains the parameters as raw γ characteristics.

Figure 10:
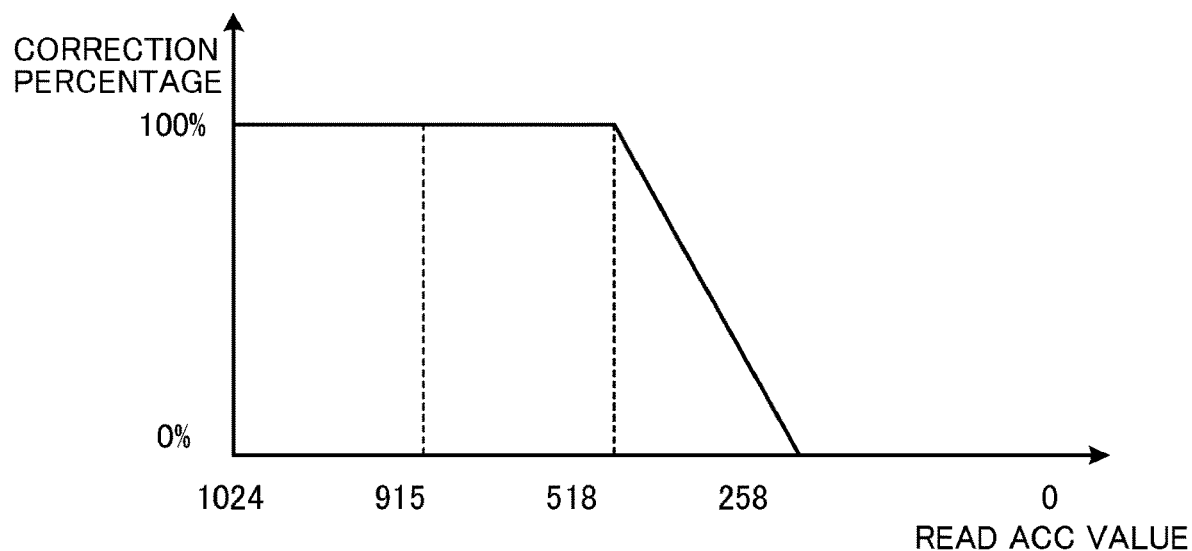
FIG. 10 is a graph illustrating a relationship between correction percentage and the read ACC value.

Referring now to FIG. 10, a description is given of the correction of the background.

FIG. 10 is a graph for describing the correction of the background on the read ACC value. Specifically, FIG. 10 is a graph illustrating a relationship between correction percentage and the read ACC value.

The CPU 6 further performs the correction of the background illustrated in FIG. 10 on the read ACC data obtained by the validity assessment of the read value of the ACC pattern as described above. The parameters are set for each image forming plate and for each of the text portion and the photograph portion.

The parameters are set as below, for example.
Reference data for correction of background:
<Basis>: 128
<Char> (for character)
<Black> Black
<LD>: 0, 258, 518, 915, 1024
<RGB>: 0, 0, 128, 128, 128
<Cyan> Cyan
<LD>: 0, 303, 555, 915, 1024
<RGB>: 0, 0, 128, 128, 128
<Magenta> Magenta
<LD>: 0, 367, 623, 915, 1024
<RGB>: 0, 0, 128, 128, 128
<Yellow> Yellow
<LD>: 0, 477, 699, 915, 1024
<RGB>: 0, 0, 128, 128, 128
<Photo> (for photograph)
<Black> Black
<LD>: 0, 258, 518, 915, 1024
<RGB>: 0, 0, 128, 128, 128
<Cyan> Cyan
<LD>: 0, 303, 555, 915, 1024
<RGB>: 0, 0, 128, 128, 128
<Magenta> Magenta
<LD>: 0, 367, 623, 915, 1024
<RGB>: 0, 0, 128, 128, 128
<Yellow> Yellow
<LD>: 0, 477, 699, 915, 1024
<RGB>: 0, 0, 128, 128, 128

Note that "Basis" indicates a background reference data standard value. "LD" indicates read ACC values. "RGB" indicates correction coefficients. The correction percentage is obtained from "Basis" and "RGB". Specifically, the correction percentage (Acc_U_Crct) is calculated by a formula $$ACC\_U\_Crct = RGB/Basis.$$

With continued reference to FIG. 10, a description is given of how to correct the background.

As the first step, the CPU 6 obtains a background correction percentage for a read ACC value as below.

For example, FIG. 10 illustrates the correction percentage for the parameters of "for character, Black" described above, with respect to the read ACC value. In FIG. 10, the horizontal axis indicates the read ACC value; whereas the vertical axis indicates the correction percentage. Note that the origin of the horizontal axis is 1024. As illustrated in FIG. 10, a background correction percentage used in actual is a value obtained by linear interpolation between correction percentages for the parameters according to the read ACC value (or read value of the ACC pattern). In FIG. 10, the solid line indicates the correction percentage for the read value.

As the second step, the CPU 6 acquires and sets a background portion (i.e., 0th step) of ACC target data as an ACC target background portion (Acc_T0).

As the third step, the CPU 6 calculates a difference between a read value of the ACC pattern (B_Det) of the background portion (i.e., 0th step) and the data of the ACC target background portion (Acc_T0) to obtain a background correction value (Cng_AccT_k) for each read ACC value by a formula $$Cng\_AccT\_k = (Acc\_T0 - B\_Det) \times (Acc\_U\_Crct\_k),$$

where "k" represents a step from 0th step to 17th step (i.e., k=0 to 17). That is, the formula indicates correction for a read value of the k-th step.

As the fourth step, the CPU 6 performs correction for all the read ACC values by adding the background correction value (Cng_AccT_k) obtained in the third step to each read ACC value (Acc_Scn_k). That is, the CPU 6 obtains a correction value (Acc_Scn_k') for each read ACC value by a formula $$Acc\_Scn\_k' = (Acc\_Scn\_k) + (Cng\_AccT\_k),$$

where "k" represents a step from 0th step to 17th step (i.e., k=0 to 17). That is, the formula indicates correction for a read value of the k-th step.

However, when the corrected read value is greater than "1024", the read value is clipped to "1024". By contrast, when the corrected read value is a negative value, the read value is clipped to "0".

Figure 11:
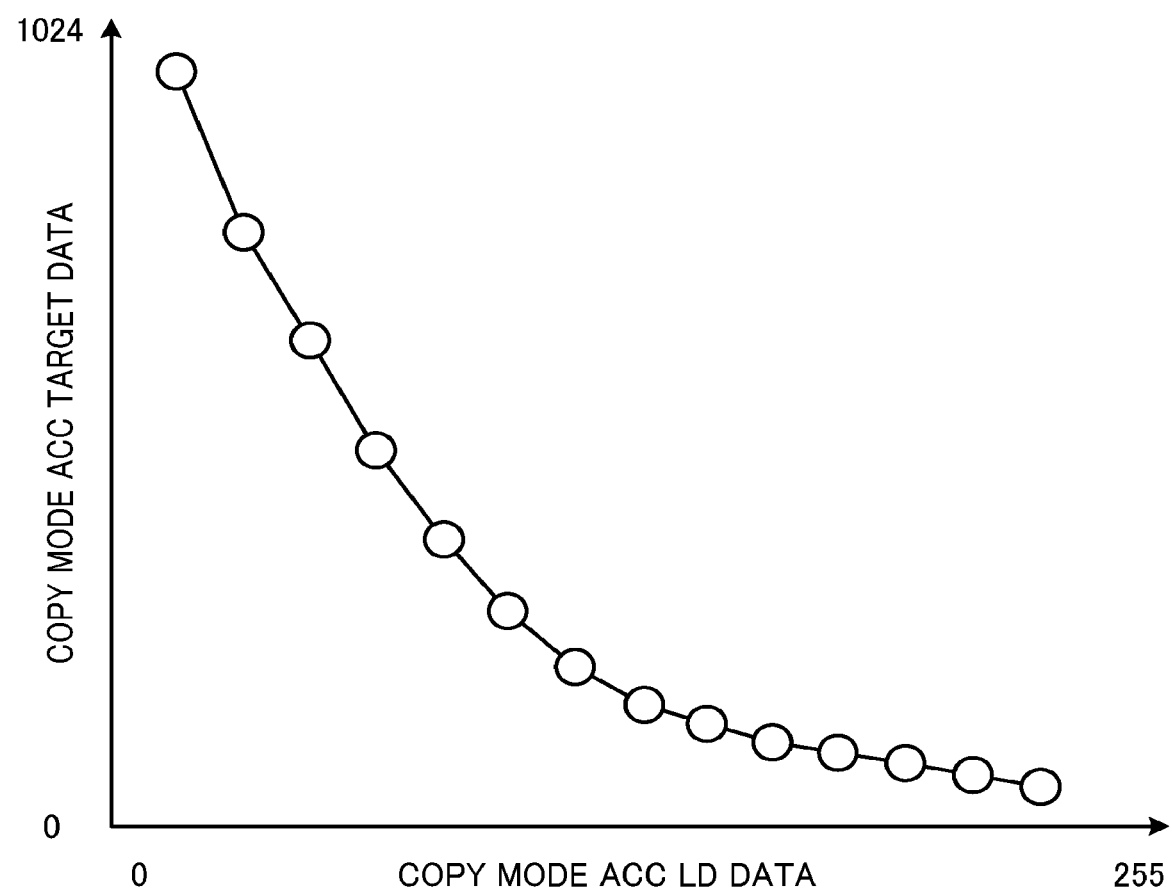
FIG. 11 is a graph illustrating a relationship between copy mode ACC target data and copy mode ACC LD data.

Referring now to FIG. 11, a description is given of the calculation of the ACC target data (i.e., characteristics).

FIG. 11 is a graph for describing the calculation of the ACC target data (i.e., characteristics). Specifically, FIG. 11 is a graph illustrating a relationship between copy mode ACC target data and copy mode ACC LD data.

After correcting the read ACC data, the CPU 6 acquires control point target data as a target for the color calibration.

As the first step, the CPU 6 selects an ACC target notch. Specifically, the CPU 6 selects an ACC target and LD data for each output plate and output mode (i.e., text or photograph) according to a preset value. The default is 0. Note that when the preset value is 0, the CPU 6 selects the ACC target and the LD data according to the top density of the corresponding color plate (i.e., read value of the 17th step for each color).

When a relation of Y<S0 is satisfied, the CPU 6 selects (ACC target data, LD data) table 1.

When a relation of Y<S1 is satisfied, the CPU 6 selects (ACC target data, LD data) table 2.

When a relation of Y<S2 is satisfied, the CPU 6 selects (ACC target data, LD data) table 3.

When a relation of Y<S3 is satisfied, the CPU 6 selects (ACC target data, LD data) table 4.

When a relation other than the above-described relations is satisfied, the CPU 6 selects (ACC target data, LD data) table 5.

Note that, in the relations described above, Y represents the read value of the 17th step of RGB_X.

<Parameter Structure>
The ACC target data (or table) for ACC is set as below, for example.
<Notch 5> Table 5
<RGB_K> 905, 800, 700, 570, 450, 350, 290, 235, 190, 165, 135, 105, 85, 65, 52, 45, 38, 30
<RGB_C> 910, 850, 770, 655, 575, 470, 415, 340, 285, 230, 190, 170, 128, 112, 93, 77, 62, 55
<RGB_M> 870, 700, 740, 640, 585, 500, 455, 405, 350, 315, 280, 230, 190, 155, 135, 105, 85, 75
<RGB_Y> 900, 850, 800, 700, 630, 570, 510, 450, 380, 340, 300, 260, 230, 205, 175, 140, 110, 100

Examples of top density thresholds are as below.
(S0, S1, S2, S3)
<RGB_K>: 10, 35, 60, 85
<RGB_C>: 38, 68, 98, 128
<RGB_M>: 10, 70, 130, 190
<RGB_Y>: 20, 90, 160, 230

Examples of the LD data (or table) for copy ACC are as below.

<Notch 5> Table 5
<LD> 0, 8, 16, 32, 48, 64, 80, 96, 112, 128, 144, 160, 176, 192, 208, 224, 240, 255

As the second step, the CPU 6 obtains a control point ACC target. In this case, the CPU 6 tabulates and retains the values obtained in the first step as ACC target (i.e., read values corresponding to target output density) characteristics with respect to the LD data (input) as below.

Figure 12:
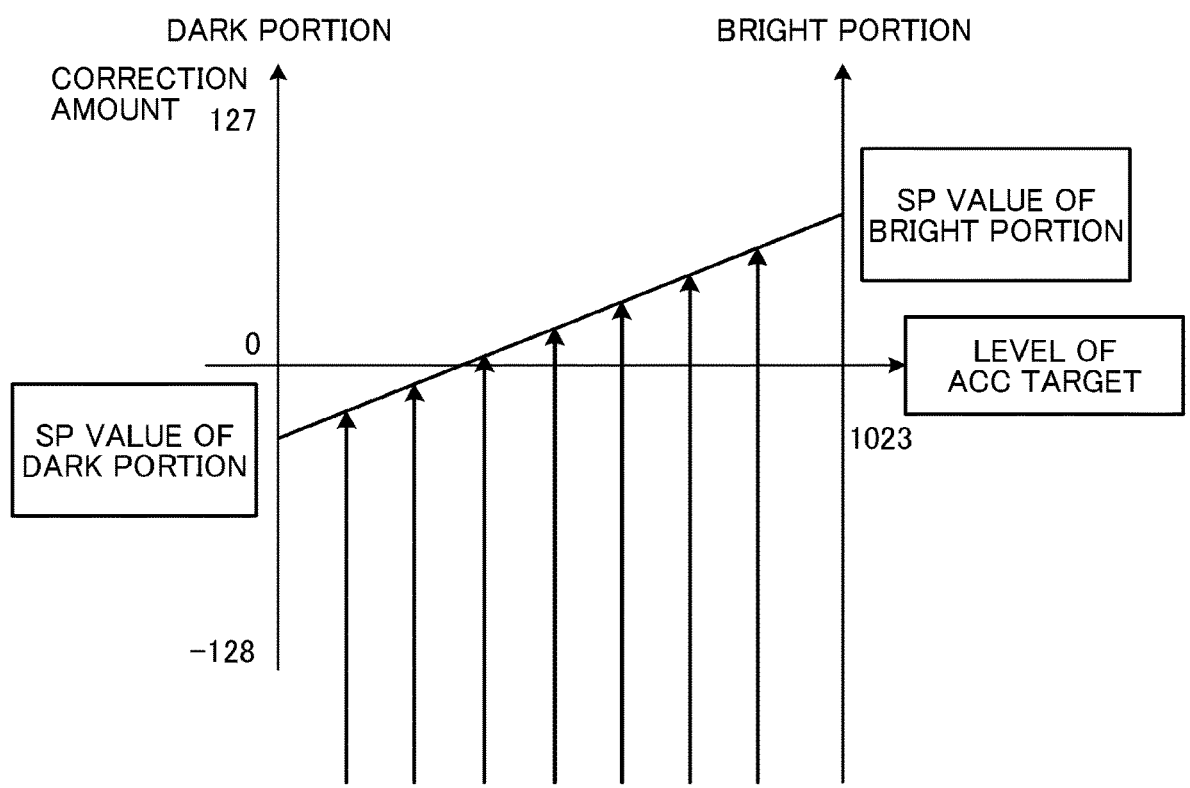
FIG. 12 is a graph illustrating a relationship between correction amount and level of ACC target.

Referring now to FIG. 12, a description is given of the correction of the ACC machine difference.

FIG. 12 is a graph for describing how to calculate an ACC machine difference correction value. Specifically, FIG. 12 is a graph illustrating a relationship between correction amount and level of ACC target. FIG. 12 conceptually illustrates the machine difference correction in color calibration or ACC, indicating pre-correction to prevent the output colors after color calibration or ACC from being different from each other depending on characteristics of individual devices.

The data herein used is the above-described ACC target data and ACC machine difference correction values (of a bright portion and a dark portion) preset in the manufacturing process or the like. As illustrated in FIG. 12, the CPU 6 calculates a correction value (ACC_KH) corresponding to the size of the ACC target data from the ACC machine difference correction values (of the bright portion and the dark portion) by linear interpolation. The CPU 6 performs such calculation for each KCMY image forming plate and for each of the text portion and the photograph portion. By use of the correction value (ACC_KH), the CPU 6 corrects the ACC target data by a formula

*ACC* target data after correction=*ACC* target data before correction+*ACC_KH*.

In short, with reference to the preset correction values of the bright portion and the dark portion, the CPU 6 calculates the machine difference correction value by linear interpolation according to the size of the ACC target data, thereby correcting the ACC target data.

Figure 13:
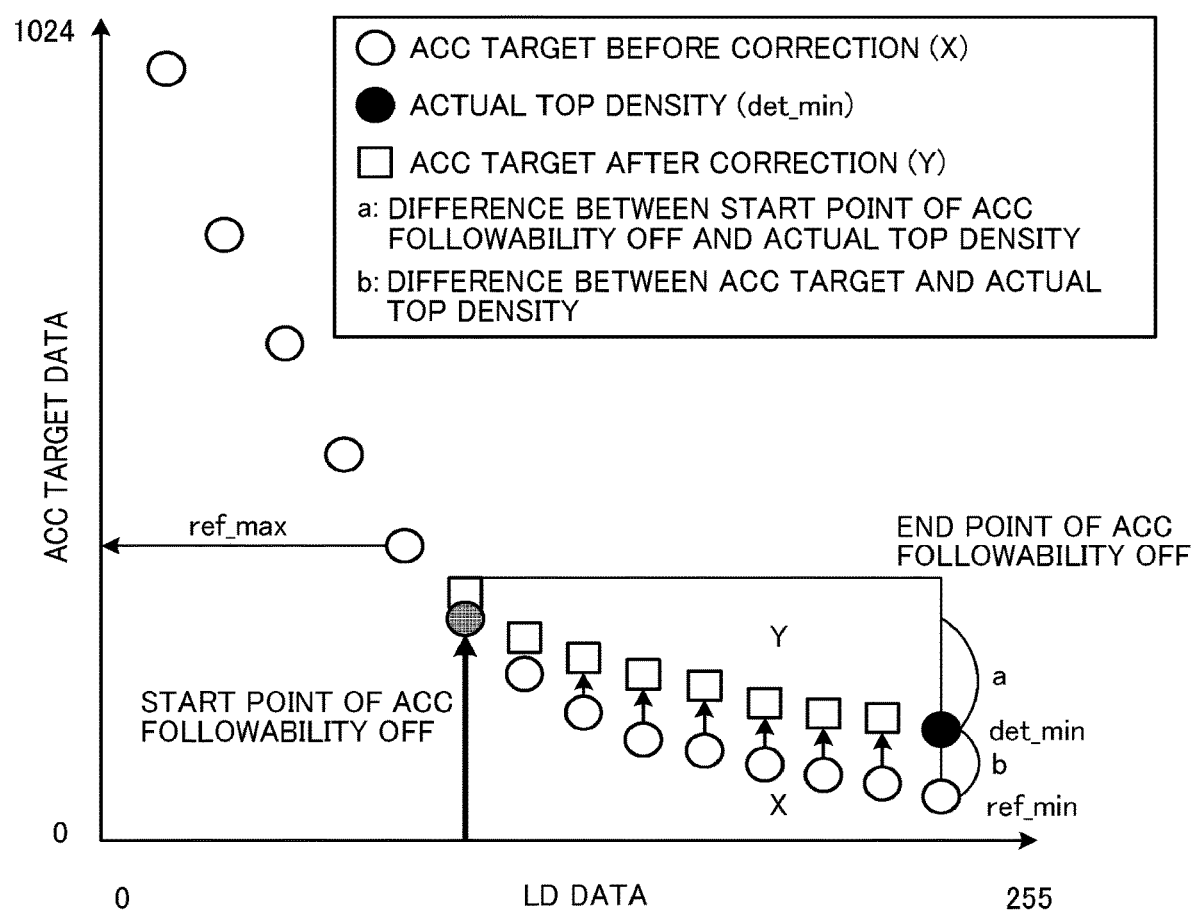
FIG. 13 is a graph illustrating a relationship between ACC target data and LD data.

Referring now to FIG. 13, a description is given of the correction of the high density portion in the ACC.

FIG. 13 is a graph for describing how to correct the high density portion in the ACC. Specifically, FIG. 13 is a graph illustrating a relationship between the ACC target data and the LD data.

The followings are data used for the correction of the high density portion ACC target:

ACC target data (i.e., target after machine difference correction);

Read ACC data (i.e., read data after correction of the background); and

ACC reference flag data.

The CPU 6 selects reference flag data (or table) calculated in advance. In the present embodiment, the CPU 6 selects a reference flag corresponding to a target selected with the control point target data.

The parameters are set as below, for example.

Reference flag data for ACC include the followings.

As for <FLAG_K>, LD data 0: ON, LD data 8: ON, LD data 16: ON, LD data 32: ON, LD data 48: ON, LD data 64: ON, LD data 80: ON, LD data 96: ON, LD data 112: ON, LD data 128: ON, LD data 144: ON, LD data 160: ON, LD data 176: OFF, LD data 192: OFF, LD data 208: OFF, LD data 224: OFF, LD data 240: OFF, and LD data 255: OFF.

As for <FLAG_C>, LD data 0: ON, LD data 8: ON, LD data 16: ON, LD data 32: ON, LD data 48: ON, LD data 64: ON, LD data 80: ON, LD data 96: ON, LD data 112: ON, LD data 128: ON, LD data 144: ON, LD data 160: ON, LD data 176: OFF, LD data 192: OFF, LD data 208: OFF, LD data 224: OFF, LD data 240: OFF, and LD data 255: OFF.

As for <FLAG_M>, LD data 0: ON, LD data 8: ON, LD data 16: ON, LD data 32: ON, LD data 48: ON, LD data 64: ON, LD data 80: ON, LD data 96: ON, LD data 112: ON, LD data 128: ON, LD data 144: ON, LD data 160: ON, LD data 176: OFF, LD data 192: OFF, LD data 208: OFF, LD data 224: OFF, LD data 240: OFF, and LD data 255: OFF.

As for <FLAG_Y>, LD data 0: ON, LD data 8: ON, LD data 16: ON, LD data 32: ON, LD data 48: ON, LD data 64: ON, LD data 80: ON, LD data 96: ON, LD data 112: ON, LD data 128: ON, LD data 144: ON, LD data 160: ON, LD data 176: OFF, LD data 192: OFF, LD data 208: OFF, LD data 224: OFF, LD data 240: OFF, and LD data 255: OFF.

From these parameters, the CPU 6 reads a start point of ACC followability OFF and an end point of ACC followability OFF. Note that the start point of ACC followability OFF is the lowest density point in a case in which the target density is changed according to the top density; whereas the end point of ACC followability OFF is the highest density point in a case in which the target density is changed according to the top density. In addition, the start point of ACC followability OFF is a point where "OFF" appears for the first time from the leading element; whereas the end point of ACC followability OFF is a point where "OFF" appears for the first time from the trailing end element.

In the present example, the start point of ACC followability OFF: LD=176, and the end point of ACC followability OFF: LD=255. The CPU 6 extracts data (i.e., read value) corresponding to the top density of the actual machine from the read value of the ACC pattern.

As illustrated in FIG. 12, "ref_max" represents ACC target data one point before the start point of ACC followability OFF. When "ON" is absent before the start point of ACC followability OFF, "ref_max" represents the target data at the start point of ACC followability OFF. On the other hand, "ref_min" represents ACC target data at the end point of ACC followability OFF. "det_min" represents the read ACC data of the patch of the 17th step corresponding to the top density). "X" represents an ACC target before the correction of the high density portion ACC target. "Y" represents an ACC target after the correction of the high density portion ACC target. The correction value for the high density portion is as follows.

When (reference flag) followability is "ON", Y=X.

When (reference flag) followability is "OFF", Y=ref_max−(ref_max−X)×(ref_max−det_min)/(ref_max−ref_min).

However, when ref_max=ref_min, Y=ref_max.

The CPU 6 tabulates the corrected ACC target in association with the LD data as illustrated in FIG. 13. Note that a target value between the start point of ACC followability OFF and the top density can be obtained by, e.g., linear interpolation. When there is a contradiction in the relationship of ACC followability ON/OFF, and when the read ACC data (i.e., read value of the top density) or a target value at the start point of ACC followability OFF is smaller (i.e., higher in density) than a top target value, the CPU 6 does not perform correction.

Figure 14:
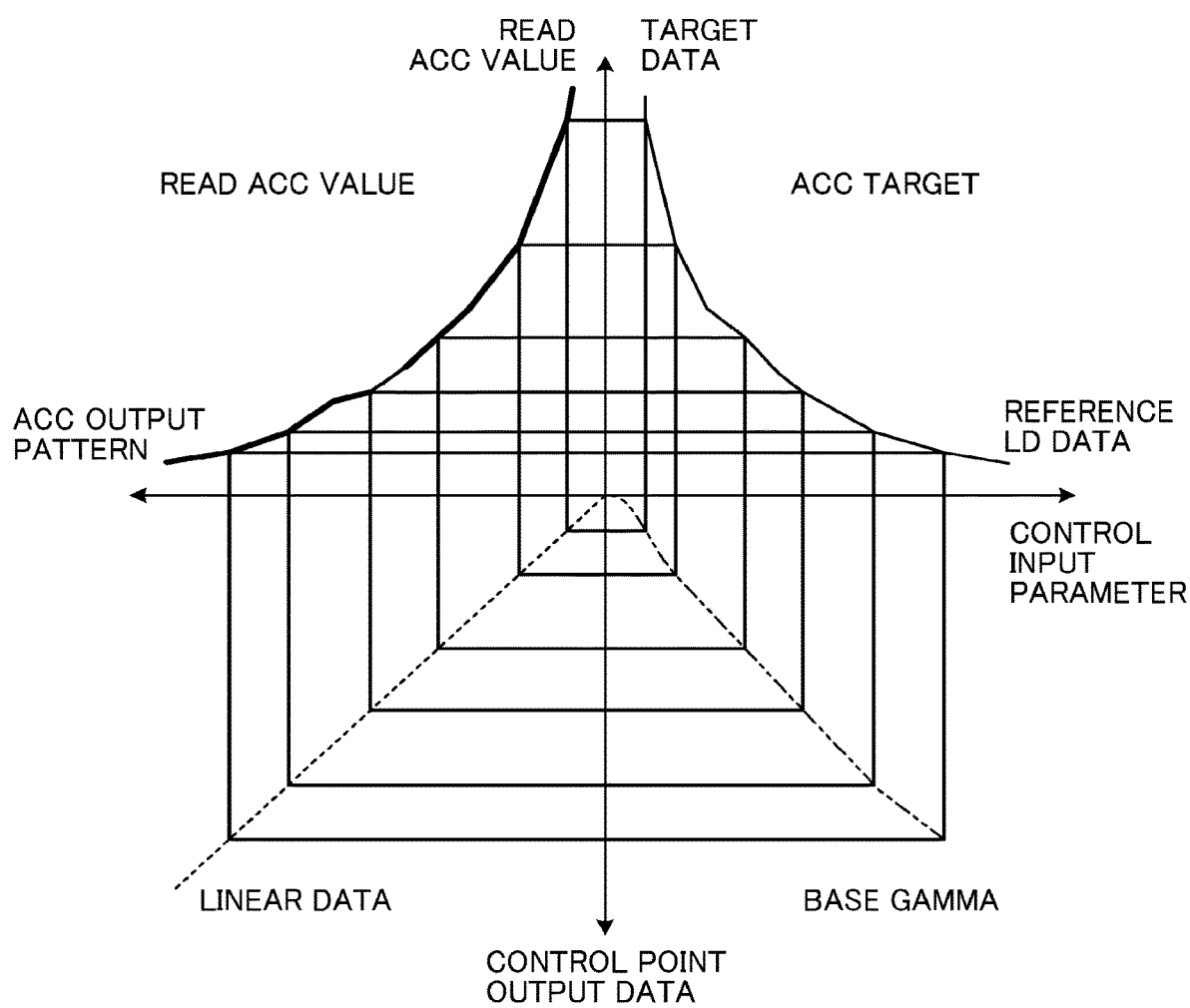
FIG. 14 is a diagram conceptually illustrating how to calculate the base γ control point in the image forming apparatus of FIG. 1.

Referring now to FIG. 14, a description is given of the calculation of the base γ control point.

FIG. 14 is a diagram conceptually illustrating how to calculate the base γ control point in the image forming apparatus 100.

In FIG. 14, the base γ control point is obtained according to the following procedure. Note that the base γ control point is "0" when a control point input parameter is "0".

For example, the following 16 parameters are used as the control point input parameters: 00h, 11h, 22h, 33h, 44h, 55h, 66h, 77h, 88h, 99h, AAh, BBh, CCh, DDh, EEh, and FFh.

As the first step, the CPU 6 obtains target data from the control point input parameter as below, by use of the ACC target subjected to the correction of the high density portion ACC target described above.

Specifically, as the first step-A, the CPU 6 searches for points of the LD data between which the control point input parameter is present.

A relationship of the control point input parameter and the LD data thus searched is as follows:

$$Ldn-1 < Am \le Ldn,$$

where Ldn represents the n-th LD data and Am represents the m-th control point input parameter.

As the first step-B, the CPU 6 obtains the ACC target data corresponding to the control point input parameter (Am) by linear interpolation from the ACC target data set for Ldn−1 and Ldn.

Specifically, the CPU 6 obtains the target data for the control point input parameter (Am) by a formula $$Acc\_Tm'=((Acc\_Tn-Acc\_Tn-1)/(Ldn-Ldn-1))\times(Am-Ldn)+Acc\_Tn,$$

where Acc_Tn represents the ACC target data or ACC target for the n-th LD data and Acc_Tm' represents the ACC target data after interpolation or ACC target for the m-th control point input parameter.

As the first step-C, the CPU 6 repeats the first step-A and the first step-B described above for all the control point input parameters (Am) to obtain ACC target data corresponding to each control point input parameter (Am).

As the second step, the CPU 6 obtains a base γ control point by performing the following steps or processes with the read value of the ACC pattern subjected to the correction of the background, the ACC target data calculated in the first step, and the control point input parameters described above.

Specifically, as the second step-A, the CPU 6 searches for a section, in which the ACC target data obtained in the first step is present, among the read values of the ACC pattern subjected to the correction of the background.

A relationship of the read ACC value with respect to the ACC target data (Acc_Tm') is as follows:

$$Acc\_Scn\_k' < Acc\_Tm' \le Acc\_Scn\_k-1',$$

where Acc_Tm' represents the ACC target data or ACC target for the m-th control point input parameter and Acc_Scn_k' represents the k-th read value of the ACC pattern or read ACC value.

As the second step-B, the CPU 6 obtains ACC output pattern data corresponding to the ACC target data by linear interpolation from the ACC output pattern data corresponding to Acc_Scn_k−1' and Acc_Scn_k'.

The ACC output pattern data for the control point input parameter is obtained by a formula $$Acc\_Pm'=((Acc\_Pk-Acc\_Pk-1)/(Acc\_Scn\_k'-Acc\_Scn\_k-1'))\times(Acc\_Tm'-Acc\_Scn\_k')+Acc\_Pk,$$

where Acc_Pk represents the k-th ACC output pattern data or ACC output pattern and Acc_Pm' represents the ACC output pattern data after interpolation or ACC output pattern for the m-th control point input parameter.

As the second step-C, the CPU 6 repeats the second step-A and the second step-B described above for all the control point input parameters Acc_Sm'.

As the third step, the CPU 6 obtains a final base γ control point parameter. Since the Acc_Pm' obtained in the second step-C is a base γ control point output parameter, the final base γ control point parameter is as follows:

(Control *point* input parameter, base γ control *point* output parameter)=(*Am, Acc_Pm'*).

Figure 15:
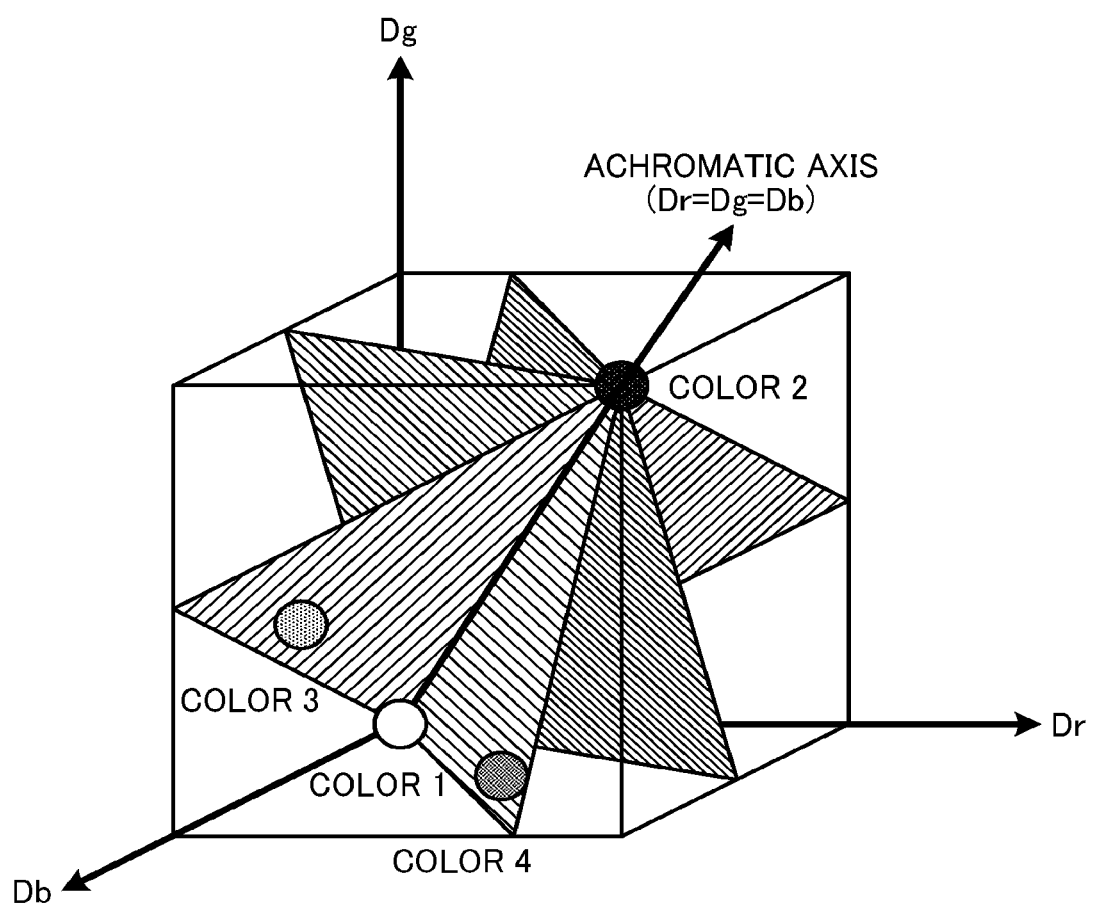
FIG. 15 is a diagram for describing how to calculate a masking coefficient in a hue segmentation system used by a color converting unit in the image forming apparatus of FIG. 1.
Figure 16:
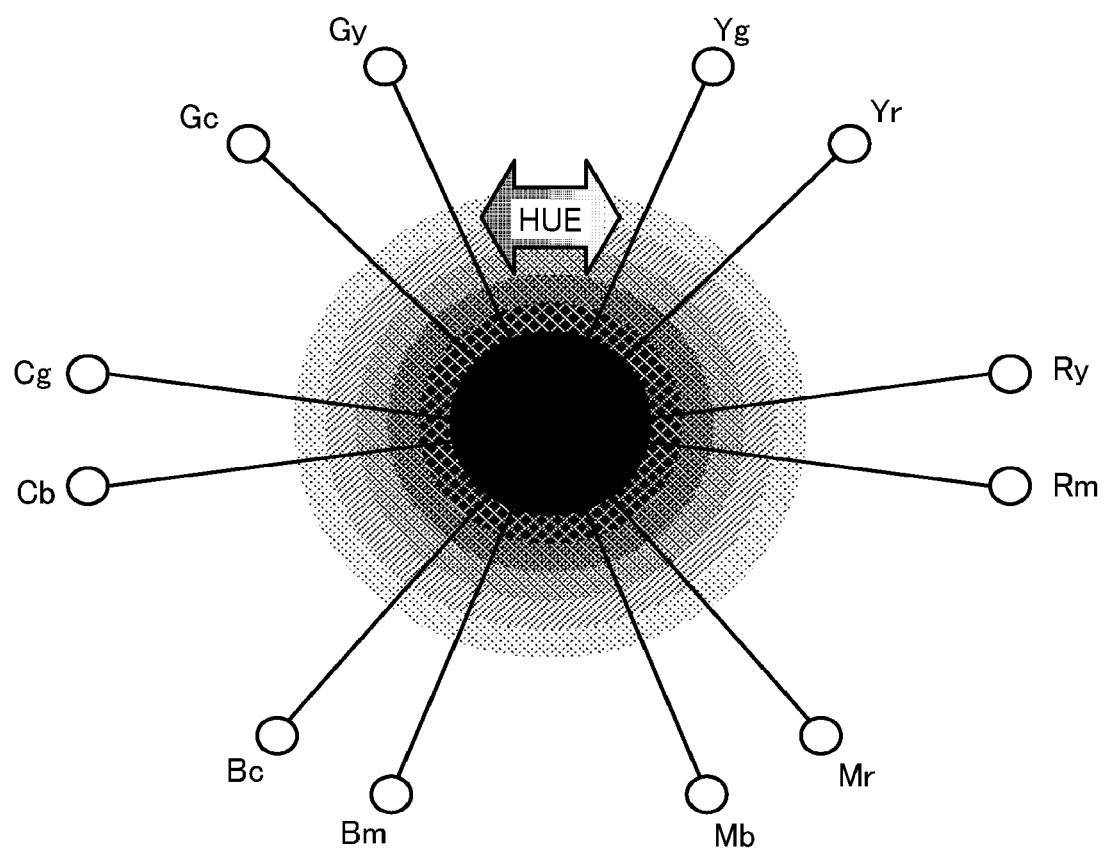
FIG. 16 is a diagram for describing a hue segmentation method in hue segmentation color conversion employed by the color converting unit in the image forming apparatus of FIG. 1.

Referring now to FIGS. 15 and 16, a description is given of the color conversion performed by the color converting unit 33 illustrated in FIG. 2 in the image forming apparatus 100.

FIG. 15 is a diagram for describing how to calculate a masking coefficient in a hue segmentation system used by the color converting unit 33 in the image forming apparatus 100. FIG. 16 is a diagram for describing a hue segmentation method in hue segmentation color conversion employed by the color converting unit 33 in the image forming apparatus 100.

As described above, the color converting unit 33 performs color conversion on a read value of a color calibration test pattern subjected to the scanner correction. Specifically, the color converting unit 33 performs a linear masking operation for each color area that is hue-segmented based on a magnitude relationship of the RGB values.

The color converting unit 33 performs the hue segmentation on the RGB data on planes that radially spread around an achromatic axis (Dr=Dg=Db) with respect to an entire three-dimensional RGB color space as illustrated in FIG. 15. As a specific example of hue determination, the color converting unit 33 converts image signals (snpr, snpg, and snpb) into hue signals (HUE) and compares the hue signals (HUE) with hue boundary values (HUE00 to HUE11). Based on the comparison result, the color converting unit 33 determines a hue area (of 12 segmented areas) illustrated in FIG. 16, thereby outputting a hue area signal (Huejo).

A description is now given of generation of color difference signals.

The color converting unit 33 generates color difference signals (x, y) from differences of the image signals (snpr, snpg, and snpb) (e.g., G component−R component and B component−G component).

A description is now given of detection of a wide area hue.

The color converting unit 33 generates a wide area hue signal (HUEH) from the color difference signals (x, y). The wide area hue signal (HUEH) indicates a position at the time when an X-Y signal plane is divided into eight segments as illustrated in FIG. 16.

A description is now given of rotation of color difference signals.

The color converting unit 33 generates color difference signals (XA, YA) according to the wide area hue signal (HUEH). The color difference signals (XA, YA) are coordinates at the time when a color difference signal plane (X, Y) is rotated and moved to an area of "HUEH=0".

A description is now given of detection of a narrow area hue.

The color converting unit 33 generates a narrow area hue signal (HUEL) from the color difference signals (XA, YA). The narrow area hue signal (HUEL) is an inclination (HUEL/32=YA/XA) of the color difference signal plane coordinates.

A description is now given of a hue boundary register.

The color converting unit 33 outputs hue boundary register (HUE00 to HUE11) setting values.

A description is now given of determination of a hue area.

The color converting unit 33 compares hue boundary signals (HUE00 to HUE11: 8 bits) with a hue signal (HUEHL {HUEH, HUEL}) in magnitude correlation, thereby generating a hue area (HUE).

A description is now given of hue segmentation masking.

The color converting unit 33 performs a masking operation based on a hue (HUE) obtained by the hue area determination. In the image forming apparatus 100, the color converting unit 33 performs the masking operation from scanner RGB to standardized RGB data such as Commission internationale de l'éclairage (CIE)XYZ.

The color converting unit 33 herein performs a product-sum operation of linear masking of 12-hue segmentation for each color of RGB. Based on a hue determination signal HUE calculated by the hue area determination, the color converting unit 33 selects a color correction coefficient and a color correction constant for the masking operation. Note that a masking coefficient for each hue is determined based on the correspondence of (Dr, Dg, Db)⇔(Dc, Dm, Dy, Dk) of four points including two points on the achromatic axis and two points on opposite boundary planes. An input color and an output color (or complementary color) are herein defined as RGB (i.e., scanner vector) and CMYK (i.e., printer vector), respectively. However, any other attributes of input and output data are settable as appropriate. General-purpose color conversion is possible. A masking operation from scanner RGB to CIEXYZ, sRGB, or the like is also possible.

In FIG. 15, in a case in which the correspondence of (Dr, Dg, Db) and (Dc, Dm, Dy, Dk) (i.e., (Dr, Dg, Db)⇔(Dc, Dm, Dy, Dk)) of the four points is as Form 1 below, the masking coefficient linking the correspondence of the matrixes is obtained by multiplying an inverse matrix of a matrix combining the right sides of Colors 1 to 4 and a matrix combining the left sides together.

(1)

$$\begin{pmatrix} D1c \\ D1m \\ D1y \\ D1k \end{pmatrix} \Leftrightarrow \begin{pmatrix} D1r \\ D1g \\ D1b \\ 1024 \end{pmatrix}$$ Color 1

$$\begin{pmatrix} D2c \\ D2m \\ D2y \\ D2k \end{pmatrix} \Leftrightarrow \begin{pmatrix} D2r \\ D2g \\ D2b \\ 1024 \end{pmatrix}$$ Color 2

$$\begin{pmatrix} D3c \\ D3m \\ D3y \\ D3k \end{pmatrix} \Leftrightarrow \begin{pmatrix} D3r \\ D3g \\ D3b \\ 1024 \end{pmatrix}$$ Color 3

$$\begin{pmatrix} D4c \\ D4m \\ D4y \\ D4k \end{pmatrix} \Leftrightarrow \begin{pmatrix} D4r \\ D4g \\ D4b \\ 1024 \end{pmatrix}$$ Color 4

Thus, the masking coefficient is obtained based on a relation of the four points including the two points on the achromatic axis (illustrated as white and black points in FIG. 15) and the two points on the opposite boundary planes. Therefore, in designing parameters for color conversion, the right side and the left side of Form 1 above are defined as the scanner vector and the printer vector, respectively, regardless of the attributes of the input and output data. Thus, the scanner vector and the printer vector are obtained for each segmentation point.

The color converting unit 33 performs the hue segmentation masking color conversion with 12 color space segmentation points constructed of two points for each of the primary colors (i.e., C, M, and Y) and for each of the secondary colors (i.e., R, G, and B) as illustrated in FIG. 16. The color converting unit 33 then sets the final scanner vector and printer vector for each of 14 points, including the white and black points on the achromatic axis and CMY single colors used in the color calibration test pattern, as illustrated in Table 1 below. Thereafter, the color converting unit 33 calculates the masking coefficient for each hue area and for each reading device in a manufacturing process.

TABLE 1

| | COLOR | SCANNER VECTOR | PRINTER VECTOR |
|---|---|---|---|
| ACHROMATIC COLOR | W | (Wr, Wg, Wb) | (Wc, Wm, Wy, Wk) |
| ACHROMATIC COLOR | K | (Kr, Kg, Kb) | (Kc, Km, Ky, Kk) |
| CHROMATIC COLOR | Rm | (Rmr, Rmg, Rmb) | (Rmc, Rmm, Rmy, Rmk) |
| CHROMATIC COLOR | Ry | (Ryr, Ryg, Ryb) | (Ryc, Rym, Ryy, Ryk) |
| CHROMATIC COLOR | Yr | (Yrr, Yrg, Yrb) | (Yrc, Yrm, Yry, Yrk) |
| CHROMATIC COLOR | Yg | (Ygr, Ygg, Ygb) | (Ygc, Ygm, Ygy, Ygk) |
| CHROMATIC COLOR | Gy | (Gyr, Gyg, Gyb) | (Gyc, Gym, Gyy, Gyk) |
| CHROMATIC COLOR | Gc | (Gcr, Gcg, Gcb) | (Gcc, Gcm, Gcy, Gck) |
| CHROMATIC COLOR | Cg | (Cgr, Cgg, Cgb) | (Cgc, Cgm, Cgy, Cgk) |
| CHROMATIC COLOR | Cb | (Cbr, Cbg, Cbb) | (Cbc, Cbm, Cby, Cbk) |
| CHROMATIC COLOR | Bc | (Bcr, Bcg, Bcb) | (Bcc, Bcm, Bcy, Bck) |
| CHROMATIC COLOR | Bm | (Bmr, Bmg, Bmb) | (Bmc, Bmm, Bmy, Bmk) |
| CHROMATIC COLOR | Mb | (Mbr, Mbg, Mbb) | (Mbc, Mbm, Mby, Mbk) |
| CHROMATIC COLOR | Mr | (Mrr, Mrg, Mrb) | (Mrc, Mrm, Mry, Mrk) |

In this case, the continuity at each boundary of the hue areas is maintained.

$Rout = coef\_rr[hue] \times Rin + coef\_rg[hue] \times Gin + coef\_rb[hue] \times Bin + const$ $Gout = coef\_gr[hue] \times Rin + coef\_gg[hue] \times Gin + coef\_gb[hue] \times Bin + const$ $Bout = coef\_br[hue] \times Rin + coef\_bg[hue] \times Gin + coef\_bb[hue] \times Bin + const$ $Kout = coef\_kr[hue] \times Rin + coef\_kg[hue] \times Gin + coef\_kb[hue] \times Bin + const$ In the formulas above, inputs of RGB are represented by Rin, Gin, and Bin, respectively. Specifically, Rin represents a scanner R output (i.e., value of R component read by scanner). Gin represents a scanner G output (i.e., value of G component read by scanner). Bin represents a scanner B output (i.e., value of B component read by scanner).

In the formulas above, outputs of RGB are represented by Rout, Gout, and Bout, respectively. Specifically, Rout represents an R output (i.e., standard R component: e.g., CIEXYZ_X). Gout represents a G output (i.e., standard G component: e.g., CIEXYZ_Y). Bout represents a B output (i.e., standard B component: e.g., CIEXYZ_Z). Kout represents a K output (i.e., standard K component: e.g., CIEXYZ_Y).

In the formulas above, coefficients are represented by coef_[hue] and const. Specifically, coef_[hue] represents a masking coefficient for color separation in a hue area. Const represents a constant.

A description is now given of some advantages of the embodiments of the present disclosure.

As described above, the image forming apparatus 100 reads, with the reading device 1, an ACC test pattern or ACC pattern formed on a recording medium. The image forming apparatus 100 then analyzes read values of a plurality of blank areas adjacent to the ACC pattern as an error detection target, thereby estimating an amount and a direction of positional deviation of the ACC pattern, more specifically, an amount of positional deviation of the ACC pattern and a direction of positional deviation of the ACC pattern. Thus, the image forming apparatus 100 detects an error. By performing such error detection, the image forming apparatus 100 enhances the accuracy of determining a reading error of the ACC pattern and generates a color calibration parameter that enables correct calibration of output characteristics of an image forming engine. By use of the color calibration parameter, the image forming apparatus 100 adjusts output γ conversion characteristics, thereby maintaining the image output density of the image forming apparatus 100, which is likely to change over time, at a constant output density. Thus, the image forming apparatus 100 maintains the color reproducibility of output images.

The image forming apparatus 100 sets the plurality of blank areas adjacent to the ACC pattern in two directions including at least an area sandwiched between solid patterns of the same color. Accordingly, the image forming apparatus 100 efficiently performs color calibration with a relatively small amount of information in consideration of the amount and the direction of deviation of a reading position from the position at which the ACC pattern is formed and the influence on the accuracy of color calibration or ACC.

The CPU 6, serving as a color calibration error detecting unit, estimates an ACC error from the amount and the direction of positional deviation of the ACC pattern estimated, thereby determining the ACC error. By the determination of the ACC error, the image forming apparatus 100 detects an error in the amount and the direction of deviation of the reading position from the position at which the ACC pattern is formed in consideration of the influence on the accuracy of color calibration or ACC obtained in accordance with the usages.

In a case in which the image forming apparatus 100 includes a plurality of reading devices 1, the image forming apparatus 100 corrects a read value of the ACC pattern to be standardized RGB data for each of the plurality of reading devices 1. In other words, the image forming apparatus 100 calibrates a read value of the ACC pattern to be standardized color data for each of the plurality of reading devices 1. By the correction, even when the reading devices 1 used for the color calibration have individual differences in characteristics, the image forming apparatus 100 detects an error in the amount and the direction of deviation of the reading position from the position at which the ACC pattern is formed in consideration of the influence on the accuracy of color calibration or ACC obtained in accordance with the usages.

According to the embodiments described above, the image forming apparatus performs an appropriate color calibration process based on a correct color calibration parameter.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:
1. An image forming apparatus, comprising:
   circuitry configured to generate a plurality of patterns in different colors and cause the plurality of patterns to be formed on a recording medium; and
   a reading device configured to read, from the recording medium, the plurality of patterns and a plurality of blank areas adjacent to the plurality of patterns to obtain read values,
   the circuitry being configured to:
      determine an error existing in the plurality of patterns, by analyzing the obtained read values of the plurality of patterns and the plurality of blank areas obtained by the reading device; and
      perform color calibration based on a color calibration parameter calculated by use of the read values of the plurality of patterns and the determined error.

2. The image forming apparatus according to claim 1, wherein the circuitry is further configured to estimate an amount and a direction of positional deviation of the plurality of patterns based on the obtained read values of the plurality of patterns and the plurality of blank areas, to determine the error in the plurality of patterns.

3. The image forming apparatus according to claim 2, wherein the circuitry is further configured to use the estimated amount and the direction of the positional deviation of the plurality of patterns, to determine the error in the plurality of patterns.

4. The image forming apparatus according to claim 2, wherein the circuitry is further configured to perform the color calibration according to the estimated amount and the direction of positional deviation of the plurality of patterns.

5. The image forming apparatus according to claim 1, further comprising a plurality of reading devices including the reading device,
wherein the circuitry is further configured to calibrate the obtained read values of the plurality of patterns to be standardized color data for each of the plurality of reading devices.

6. The image forming apparatus according to claim 1, wherein the circuitry is further configured to cause the plurality of blank areas to be set adjacent to the plurality of patterns in two directions including at least an area sandwiched between solid patterns of a same color.

7. A color calibrating method, comprising:
generating, by circuitry, a plurality of patterns in different colors and forming the plurality of patterns on a recording medium;
determining an error existing in the plurality of patterns by analyzing obtained read values of the plurality of patterns and a plurality of blank areas adjacent to the plurality of patterns the read values being obtained by reading, by a reading device, the plurality of patterns and the plurality of blank areas on the recording medium; and
performing color calibration based on a color calibration parameter calculated by use of the read values of the plurality of patterns and the determined error.

8. A non-transitory, computer-readable storage medium storing computer-readable program code that causes a computer to execute a color calibrating method, the method comprising:
generating a plurality of patterns in different colors and forming the plurality of patterns on a recording medium;
determining an error existing in the plurality of patterns by analyzing obtained read values of the plurality of patterns and a plurality of blank areas adjacent to the plurality of patterns, the read values being obtained by reading, bye a reading device, the plurality of patterns and the plurality of blank areas on the recording medium; and
performing color calibration based on a color calibration parameter calculated by use of the read values of the plurality of patterns and the determined error.

9. The image forming apparatus of claim 1, wherein the circuitry is further configured to calculate a base gamma control point as the color calibration parameter, and perform gamma correction for each of a plurality of colors using the calculated base gamma control point.

* * * * *